(12) United States Patent
Aoshima et al.

(10) Patent No.: US 12,528,047 B2
(45) Date of Patent: Jan. 20, 2026

(54) CARBON DIOXIDE RECOVERY SYSTEM

(71) Applicant: DENSO CORPORATION, Kariya (JP)

(72) Inventors: Hiroki Aoshima, Kariya (JP); Yousuke Nakamura, Kariya (JP); Hiroyuki Takikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 486 days.

(21) Appl. No.: 18/295,881

(22) Filed: Apr. 5, 2023

(65) Prior Publication Data
US 2023/0338893 A1  Oct. 26, 2023

(30) Foreign Application Priority Data

Apr. 25, 2022  (JP) .................. 2022-071908

(51) Int. Cl.
*B01D 53/32* (2006.01)
*B01D 53/34* (2006.01)
(Continued)

(52) U.S. Cl.
CPC ......... *B01D 53/326* (2013.01); *B01D 53/346* (2013.01); *B01D 53/62* (2013.01);
(Continued)

(58) Field of Classification Search
CPC ..... B01D 53/965; B01D 53/62; B01D 53/326
See application file for complete search history.

(56) References Cited

U.S. PATENT DOCUMENTS

2017/0113182 A1   4/2017  Voskian et al.
2018/0257027 A1   9/2018  Desai et al.
(Continued)

FOREIGN PATENT DOCUMENTS

JP   2021-171727 A   11/2021
JP   2022-008288 A   1/2022

OTHER PUBLICATIONS

Voskian, Sahag et al., "Faradaic Electro-Swing Reactive Adsorption for CO2 Capture", Energy & Environmental Science, vol. 12, No. 12, Dec. 4, 2019 (Dec. 4, 2019), pp. 3530-3547, XP055941462, Cambridge ISSN: 1754-5692, DOI: 10.1039/C9EE02412C; Retrieved from the Internet: URL: https://pubs.rsc.org/en/content/articlepdf/2019/ee/c9ee02412c.
Hemmatifar, Ali et al., "Electrochemically Mediated Direct CO2 Capture by a Stackable Bipolar Cell", Chemsuschem, vol. 15, No. 6, Feb. 15, 2022 (Feb. 15, 2022), XP93075033, DE ISSN: 1864-5631, DOI: 10.1002/cssc.202102533; Retrieved from the Internet: URL: https://onlinelibrary.wiley.com/doi/full-xml/10.1002/cssc.202102533.
U.S. Appl. No. 18/295,941, filed Apr. 5, 2023, Aoshima et al.

*Primary Examiner* — Brian W Cohen
(74) *Attorney, Agent, or Firm* — Posz Law Group, PLC

(57) ABSTRACT

In a carbon dioxide recovery system. an electrochemical cell of a recovery device includes a working electrode having an adsorbent capable of adsorbing carbon dioxide, and a counter electrode. A sensor detects a recovery amount of carbon dioxide recovered and sent to a carbon dioxide recovery tank. A controller applies a first potential between the electrodes only for a time period in an adsorption mode. The time period corresponds to a target amount of carbon dioxide that can be adsorbed by the adsorbent. A storage unit stores multiple adsorption-amount change data indicating association between the target amount and the time period. The controller acquires the target amount correlated with the detected recovery amount, acquires the time period by using the acquired target amount, and selects data from among the multiple adsorption-amount change data according to the recovery amount as in-use data for acquisition of the time period.

5 Claims, 13 Drawing Sheets

(51) Int. Cl.
 *B01D 53/62* (2006.01)
 *B01D 53/96* (2006.01)
(52) U.S. Cl.
 CPC ...... *B01D 53/965* (2013.01); *B01D 2257/504* (2013.01); *B01D 2258/06* (2013.01)

(56) References Cited

U.S. PATENT DOCUMENTS

| | | |
|---|---|---|
| 2020/0023307 A1 | 1/2020 | Voskian et al. |
| 2022/0184552 A1 | 6/2022 | Voskian et al. |
| 2022/0387930 A1 | 12/2022 | Iijima et al. |

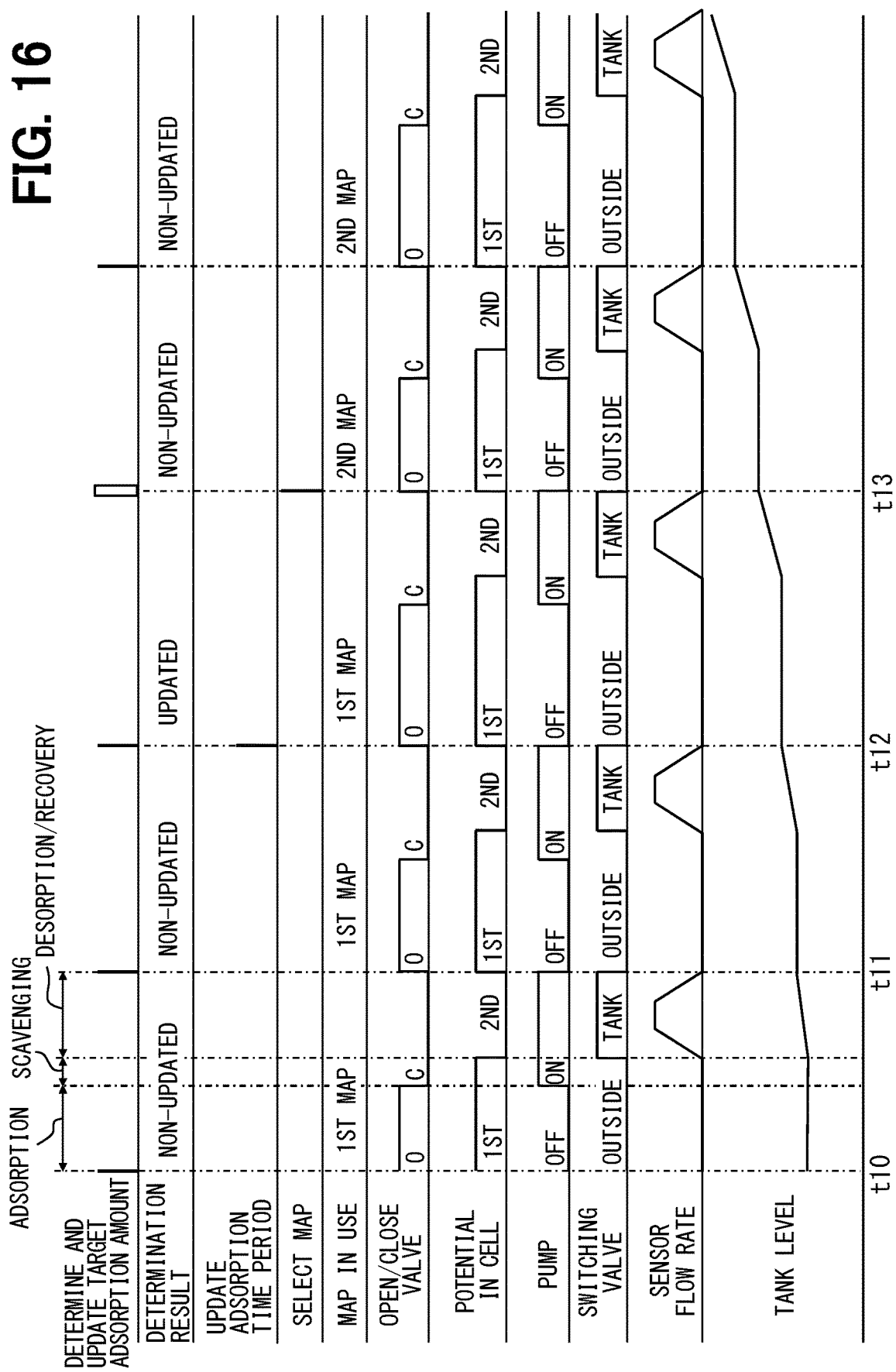

CARBON DIOXIDE RECOVERY SYSTEM

CROSS REFERENCE TO RELATED APPLICATION

This application is based on and incorporates herein by reference Japanese Patent Application No. 2022-071908 filed on Apr. 25, 2022.

TECHNICAL FIELD

The present disclosure relates to a carbon dioxide recovery system that recovers carbon dioxide from a mixed gas containing carbon dioxide.

BACKGROUND

A gas separation system that separates carbon dioxide from a mixed gas containing carbon dioxide by an electrochemical reaction.

SUMMARY

According to at least one embodiment of the present disclosure, a carbon dioxide recovery system recovers carbon dioxide from a mixed gas containing carbon dioxide by an electrochemical reaction. The carbon dioxide recovery system includes a carbon dioxide recovery tank, a recovery device, a sensor, a controller and a storage unit. The carbon dioxide recovery tank stores recovered carbon dioxide. The recovery device includes a housing and an electrochemical cell housed in the housing. The electrochemical cell includes a working electrode having an adsorbent capable of adsorbing carbon dioxide, and a counter electrode paired with the working electrode. The sensor detects a recovery amount that is an amount of carbon dioxide recovered in the recovery device and sent to the carbon dioxide recovery tank. The controller executes an adsorption mode in which carbon dioxide is adsorbed and a recovery mode in which carbon dioxide is recovered. The controller applies a first potential between the working electrode and the counter electrode only for an adsorption time period in the adsorption mode such that the adsorbent adsorbs carbon dioxide. The adsorption time period corresponds to a target adsorption amount that is an amount of carbon dioxide that can be adsorbed by the adsorbent. The controller applies a second potential between the working electrode and the counter electrode only for a recovery time period in the recovery mode such that the carbon dioxide adsorbed by the adsorbent is desorbed. The storage unit stores multiple adsorption-amount change data, each of which indicates association between the target adsorption amount and the adsorption time period. The multiple adsorption-amount change data are different in the adsorption time period associated with the target adsorption amount that has been changed. The controller acquires the target adsorption amount as a correlation value correlated with the recovery amount that is a detection result of the sensor, acquires the adsorption time period from one of the multiple adsorption-amount change data by using the acquired target adsorption amount, and selects data from among the multiple adsorption-amount change data according to the recovery amount as in-use data for acquisition of the adsorption time period.

BRIEF DESCRIPTION OF DRAWINGS

The details of one or more embodiments are set forth in the accompanying drawings and the description below. Other features and advantages will be apparent from the description and drawings, and from the claims.

FIG. 16 is a time chart showing processes in a controller according to the second embodiment.

DETAILED DESCRIPTION

Figure 1:
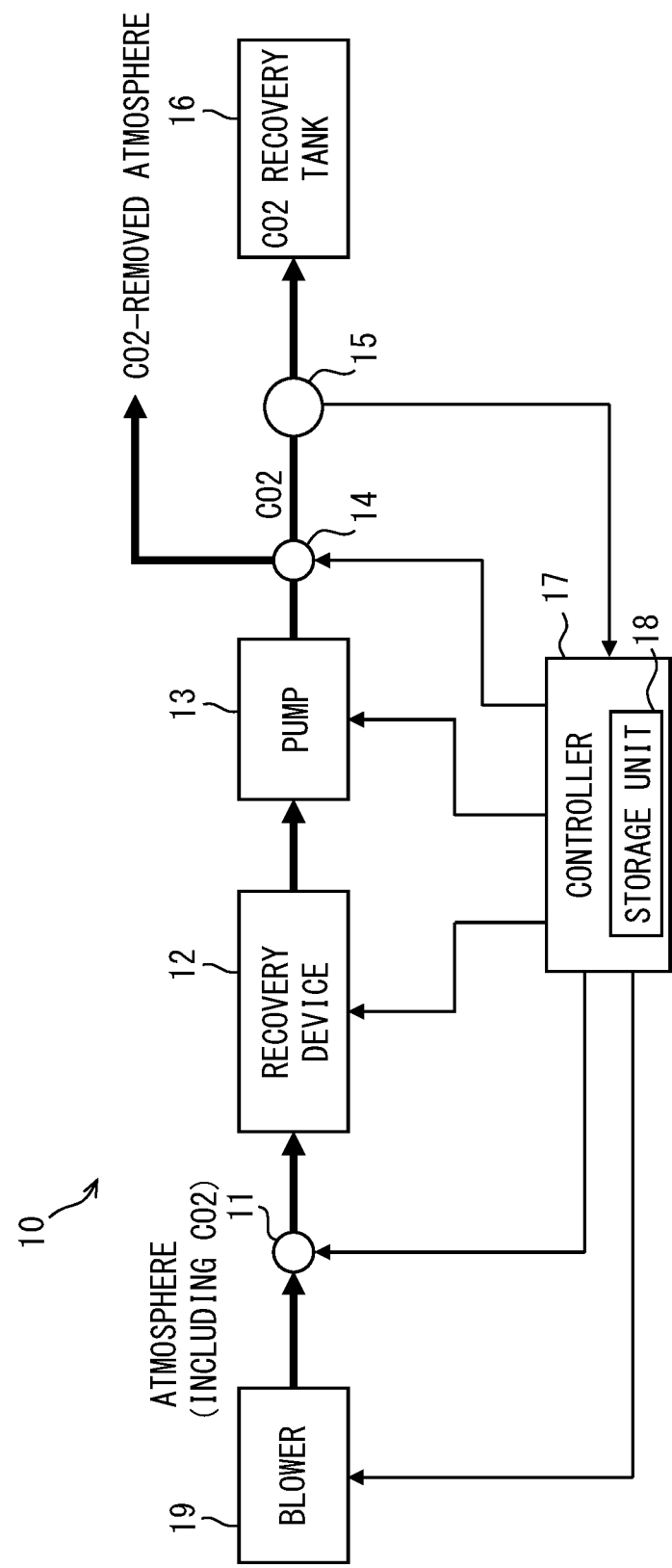
FIG. 1 is a view showing a configuration of a carbon dioxide recovery system according to an embodiment.

To begin with, examples of relevant techniques will be described. According to a comparative example, a gas separation system separates carbon dioxide from a mixed gas containing carbon dioxide by an electrochemical reaction. In this gas separation system, the mixed gas containing carbon dioxide is introduced into a housing in which an electrochemical cell is disposed. In a charge mode in which electrons are directed to the negative electrode of the electrochemical cell, an electroactive material provided on the negative electrode is reduced. Therefore, the electroactive material on the negative electrode is bonded to carbon dioxide, and the carbon dioxide is separated from the mixed gas. On the other hand, in a discharge mode in which an electron flow is generated in a direction opposite to that in the charge mode, the electroactive material on the negative electrode is oxidized. As a result, carbon dioxide is released from the electroactive material on the negative electrode.

In a carbon dioxide recovery system using an electrochemical cell, an adsorption potential is applied to the electrochemical cell in order to cause the electrochemical cell to adsorb carbon dioxide. In addition, in the carbon dioxide recovery system, in order to reduce an energy loss during adsorption, an application time period of the adsorption potential for obtaining a target adsorption amount may be appropriately controlled with an adsorption amount that can be adsorbed by the electrochemical cell as the target adsorption amount.

For acquisition of the application time period of the adsorption potential, map data may be used, in which the target adsorption amount is associated with the application time period of the adsorption potential corresponding thereto. In addition, it is difficult to directly grasp the target adsorption amount, so that the target adsorption amount may be estimated from the recovery amount of carbon dioxide. However, in the carbon dioxide recovery system using the map data, the adsorption characteristics of the electrochemical cell are uncertain, so that there is the possibility that the application time period of the adsorption potential cannot be appropriately controlled.

In contrast, according to the present disclosure, a carbon dioxide recovery system is capable of appropriately controlling an application time period of an adsorption potential.

According to an aspect of the present disclosure, a carbon dioxide recovery system recovers carbon dioxide from a mixed gas containing carbon dioxide by an electrochemical reaction. The carbon dioxide recovery system includes a carbon dioxide recovery tank, a recovery device, a sensor, a controller and a storage unit. The carbon dioxide recovery tank stores recovered carbon dioxide. The recovery device includes a housing and an electrochemical cell housed in the housing. The electrochemical cell includes a working electrode having an adsorbent capable of adsorbing carbon dioxide, and a counter electrode paired with the working electrode. The sensor detects a recovery amount that is an amount of carbon dioxide recovered in the recovery device and sent to the carbon dioxide recovery tank. The controller executes an adsorption mode in which carbon dioxide is adsorbed and a recovery mode in which carbon dioxide is recovered. The controller applies a first potential between the working electrode and the counter electrode only for an adsorption time period in the adsorption mode such that the adsorbent adsorbs carbon dioxide. The adsorption time period corresponds to a target adsorption amount that is an amount of carbon dioxide that can be adsorbed by the adsorbent. The controller applies a second potential between the working electrode and the counter electrode only for a recovery time period in the recovery mode such that the carbon dioxide adsorbed by the adsorbent is desorbed. The storage unit stores multiple adsorption-amount change data, each of which indicates association between the target adsorption amount and the adsorption time period. The multiple adsorption-amount change data are different in the adsorption time period associated with the target adsorption amount that has been changed. The controller acquires the target adsorption amount as a correlation value correlated with the recovery amount that is a detection result of the sensor, acquires the adsorption time period from one of the multiple adsorption-amount change data by using the acquired target adsorption amount, and selects data from among the multiple adsorption-amount change data according to the recovery amount as in-use data for acquisition of the adsorption time period.

According to the carbon dioxide recovery system of the present disclosure, the multiple adsorption amount change data, in which the target adsorption amount is associated with the adsorption time period for acquisition of the target adsorption amount, are stored in the storage unit. The plurality of pieces of adsorption amount change data have different adsorption time periods associated with the target adsorption amount. Then, the carbon dioxide recovery system selects data as in-use data for acquisition of the adsorption time period from among the multiple adsorption amount change data according to the recovery amount that is the detection result through the sensor. Therefore, the carbon dioxide recovery system can appropriately control the adsorption time period that is an application time period of an adsorption potential (i.e. first potential).

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereinafter, a carbon dioxide recovery system according to an embodiment of the present disclosure will be described in detail with reference to the drawings. In the drawings, the same or equivalent portions are denoted by the same reference numerals. The carbon dioxide recovery system according to the present embodiment recovers carbon dioxide from a mixed gas (e.g., atmospheric gas) containing carbon dioxide. The mixed gas from which the carbon dioxide has been removed is discharged to the outside (atmosphere). FIG. 1 shows a configuration of a carbon dioxide recovery system 10 according to the present embodiment.

The carbon dioxide recovery system 10 shown in FIG. 1 includes a channel open/close valve 11, a recovery device 12, a pump 13, a channel switching valve 14, a sensor 15, a $CO_2$ recovery tank 16, a controller 17, and a blower 19.

An open-closed state of the channel open/close valve 11 is controlled by the controller 17. When the channel open/close valve 11 is opened, a mixed gas containing carbon dioxide can be introduced into the recovery device 12 through a channel pipe communicating the outside (atmosphere) and the inside of the recovery device 12. On the other hand, when the channel open/close valve 11 is closed, the channel pipe communicating the outside and the inside of the recovery device 12 is blocked, and the recovery device 12 is sealed from the outside.

The blower 19 is driven by the controller 17 when the channel open/close valve 11 is opened, and sends the mixed gas containing carbon dioxide into the recovery device 12 through the channel pipe communicating the outside and the inside of the recovery device 12. However, the blower 19 may be omitted. Alternatively, the pump 13 may also serve as the blower 19. That is, when the channel open/close valve 11 is opened, the pump 13 may be driven such that the mixed gas containing carbon dioxide is drawn into the recovery device 12 from the outside through the channel pipe.

The recovery device 12 includes an electrochemical cell disposed inside a housing made of, for example, a metal. The electrochemical cell can adsorb carbon dioxide by an electrochemical reaction to separate the carbon dioxide from the mixed gas, and desorb the adsorbed carbon dioxide to accumulate the desorbed carbon dioxide in the $CO_2$ recovery tank 16 by the pump 13. The recovery device 12 has two openings. One of the openings is an introduction port for introducing the mixed gas containing carbon dioxide into the housing of the recovery device 12 from the outside. The other of the openings is a discharge port for discharging the mixed gas from which the carbon dioxide has been removed or the carbon dioxide desorbed from the electrochemical cell. The above channel pipe communicating the outside and the inside of the recovery device 12 is connected to the introduction port, and a channel pipe provided with the pump 13 is connected to the discharge port. Note that the inside of the recovery device 12 is the same as the inside of the housing.

A plurality of electrochemical cells are stacked and disposed in the housing of the recovery device 12. The stacking direction of the plurality of electrochemical cells is a direction orthogonal to the flow direction of the mixed gas. Each electrochemical cell is formed in a plate shape, and is disposed such that a plate surface intersects with the stacking direction of the cells. A predetermined gap is provided between the adjacent electrochemical cells. The gap provided between the adjacent electrochemical cells serves as a gas channel through which the mixed gas flows.

Each electrochemical cell is configured by stacking, for example, a working electrode current collecting layer, a working electrode, a separator, a counter electrode, a counter electrode current collecting layer, and the like in the described order. The working electrode is a negative electrode, and the counter electrode paired with the working electrode is a positive electrode. By changing a potential difference to be applied between the working electrode and the counter electrode, electrons can be provided to the working electrode so that a carbon dioxide adsorbent of the working electrode is caused to adsorb carbon dioxide, or electrons can be released from the working electrode so that the carbon dioxide adsorbent is caused to desorb the adsorbed carbon dioxide. The carbon dioxide adsorbent corresponds to an adsorbent.

The working electrode current collecting layer is made of a porous conductive material having pores through which the mixed gas containing carbon dioxide can pass. The working electrode current collecting layer only needs to have gas permeability and conductivity, and as a material for forming the working electrode current collecting layer, for example, a metal material or a carbonaceous material can be used.

The working electrode is formed of a material obtained by mixing the carbon dioxide adsorbent, a conductive substance, a binder, and the like. The carbon dioxide adsorbent has a property of adsorbing carbon dioxide by receiving electrons and desorbing the adsorbed carbon dioxide by releasing electrons. As the carbon dioxide adsorbent, for example, polyanthraquinone can be used. The conductive substance forms a conductive path to the carbon dioxide adsorbent. As the conductive substance, for example, a carbon material, such as a carbon nanotube, carbon black, or graphene, can be used. The binder is for holding the carbon dioxide adsorbent and the conductive substance. As the binder, for example, a conductive resin can be used. As the conductive resin, for example, an epoxy resin containing Ag or the like as a conductive filler, a fluororesin such as polytetrafluoroethylene (PTFE) or polyvinylidene fluoride (PVDF), or the like can be used.

The counter electrode is formed of a material obtained by mixing an electroactive auxiliary material, a conductive substance, a binder, and the like. Since the conductive substance and the binder of the counter electrode are similar to the conductive substance and the binder of the working electrode, description thereof is omitted. The electroactive auxiliary material of the counter electrode is made of a material having an active substance serving as an electron donor. The electroactive auxiliary material of the counter electrode is an auxiliary electroactive species that exchanges electrons with the carbon dioxide adsorbent of the working electrode. As the electroactive auxiliary material, for example, a metal complex capable of exchanging electrons by changing the valence of a metal ion can be used. Examples of such a metal complex include cyclopentadienyl metal complexes such as ferrocene, nickelocene, and cobaltocene, porphyrin metal complexes, and the like. These metal complexes may be polymers or monomers. Similarly to the working electrode current collecting layer, the counter electrode current collecting layer is formed of a conductive material such as a metal material or a carbonaceous material.

The separator is disposed between the working electrode and the counter electrode to separate the working electrode and the counter electrode. The separator is an insulating ion permeable membrane that prevents physical contact between the working electrode and the counter electrode to suppress an electrical short circuit, and causes ions to pass therethrough. As the separator, a cellulose membrane, a polymer, a composite material of a polymer and a ceramic, or the like can be used.

In the electrochemical cell, an electrolyte is provided across the working electrode and the counter electrode. As the electrolyte, for example, an ionic liquid can be used. The ionic liquid is a liquid salt that is non-volatile under normal temperature and pressure.

The pump 13 sucks the residual mixed gas left in the recovery device 12 from the recovery device 12 and discharges the mixed gas to the outside (i.e., scavenges the residual mixed gas in the recovery device 12). And, when the carbon dioxide adsorbed by the carbon dioxide adsorbent is desorbed, the pump 13 sucks the desorbed carbon dioxide from the recovery device 12 and discharges the carbon dioxide toward the $CO_2$ recovery tank 16. When the pump 13 scavenges the residual mixed gas in the recovery device 12, the channel open/close valve 11 blocks the channel pipe communicating the outside and the inside of the recovery device 12. Therefore, the scavenging of the residual mixed gas in the recovery device 12 is performed by evacuation by the pump 13. In addition, the subsequent discharge of the carbon dioxide to the $CO_2$ recovery tank 16 is also performed in a state closer to a vacuum than the atmosphere.

The channel switching valve 14 is a three-way valve that switches the channel for a gas flowing through the pipe on the downstream side of the pump 13. Switching the channel of the channel switching valve 14 is controlled by the controller 17. Specifically, when the mixed gas containing carbon dioxide is introduced into the recovery device 12 and when the residual mixed gas in the recovery device 12 is scavenged by the pump 13, the controller 17 controls the channel switching valve 14 such that the pipe on the downstream side of the pump 13 communicates with the outside (atmosphere). As a result, the mixed gas from which the carbon dioxide has been removed and the residual mixed gas in the recovery device 12 are released to the outside. On the other hand, when the carbon dioxide adsorbent desorbs the adsorbed carbon dioxide and when the pump 13 sucks the desorbed carbon dioxide from the recovery device 12 and discharges the carbon dioxide, the controller 17 controls the channel open/close valve 11 such that the pipe on the downstream side of the pump 13 communicates with the $CO_2$ recovery tank 16 side. As a result, the carbon dioxide recovered by the recovery device 12 can be accumulated in the $CO_2$ recovery tank 16.

The sensor 15 detects the carbon dioxide concentration and the flow rate of the gas flowing through the pipe connected to the $CO_2$ recovery tank 16 at predetermined time intervals. The controller 17 can calculate (detect), from the carbon dioxide concentration and the flow rate detected by the sensor 15, the recovery amount of the carbon dioxide recovered in the $CO_2$ recovery tank 16. This carbon dioxide recovery amount corresponds to a detection result through the sensor. The carbon dioxide recovery amount may be calculated by the sensor 15. In this case, the sensor 15 outputs the carbon dioxide recovery amount to the controller 17. The carbon dioxide recovery amount can also be said to be a carbon dioxide monitor value. The carbon dioxide recovery amount corresponds to a recovery amount.

Figure 5:
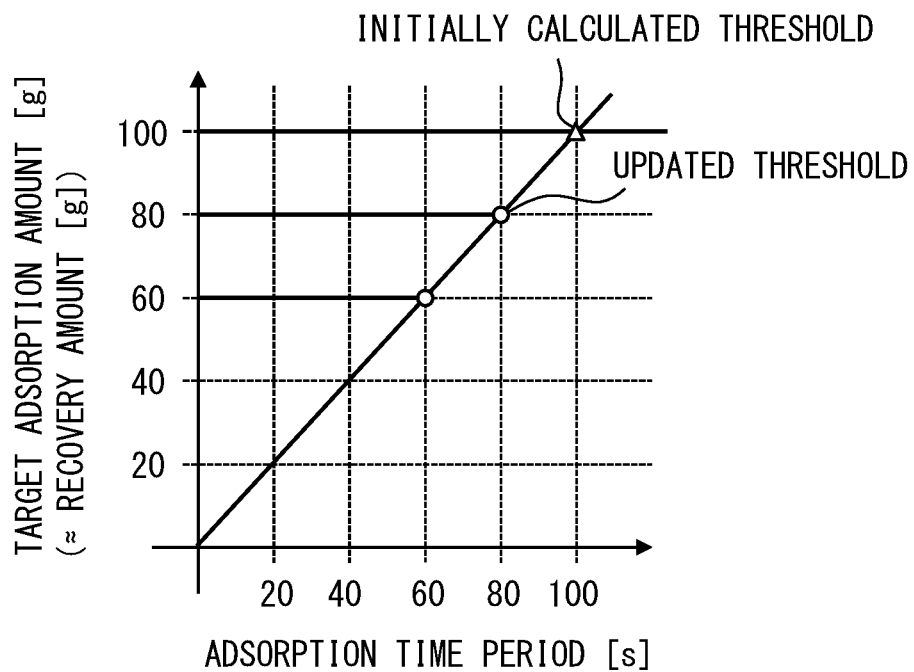
FIG. 5 is a graph showing an example of adsorption amount change map data.
Figure 6:
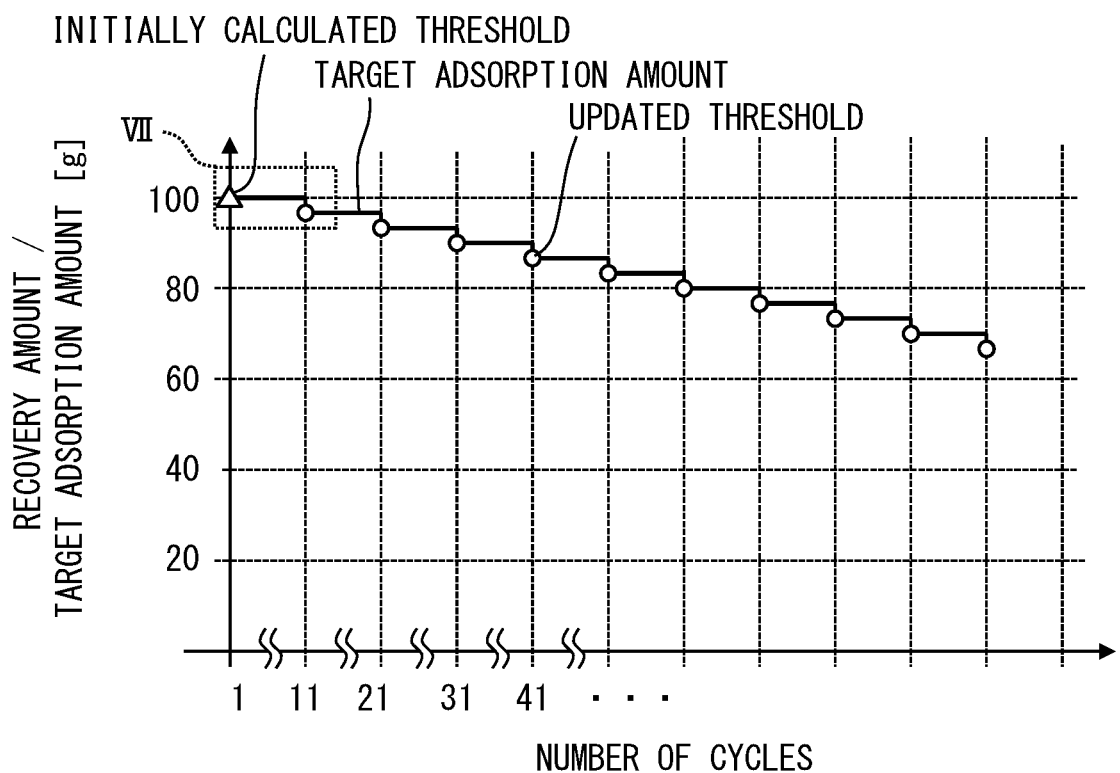
FIG. 6 is a graph showing an example of recovery amount change map data.
Figure 7:
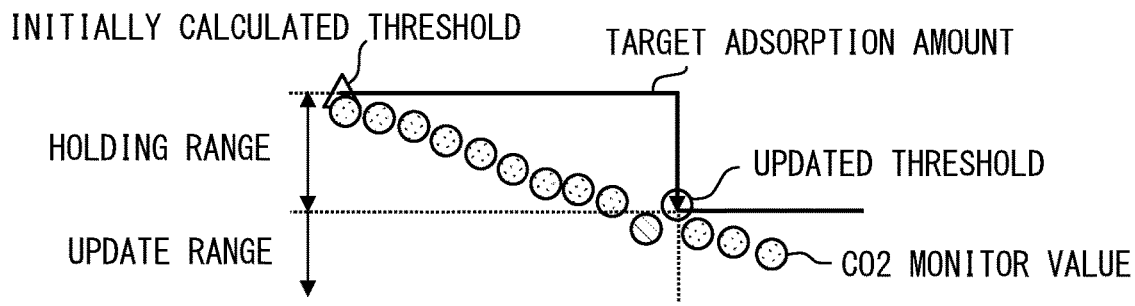
FIG. 7 is an enlarged graph of a portion VII in FIG. 6.

The controller 17 includes a known microcomputer including a CPU, a ROM, a RAM, and the like, and peripheral devices thereof. The peripheral devices include a storage unit 18 having a storage medium. The storage unit 18 stores adsorption amount change map data and recovery amount change map data. The adsorption amount change map data corresponds to adsorption-amount change data. The recovery amount change map data corresponds to recovery-amount change data. In the adsorption amount change map data, an adsorption time period is associated with a target carbon dioxide adsorption amount, as shown in FIG. 5. In the recovery amount change map data, a change in the carbon dioxide recovery amount is associated with the target carbon dioxide adsorption amount, as shown in FIGS. 6 and 7. The target carbon dioxide adsorption amount is also referred to as a maximum adsorption amount. The adsorption time period is also referred to as an adsorption mode execution time period. The adsorption amount change map data and the recovery amount change map data will be described in detail later.

The controller 17 performs various arithmetic processing on the basis of a control program stored in the storage medium such as a ROM, and controls operations of various control target devices such as the channel open/close valve 11, the recovery device 12, the pump 13, the channel switching valve 14, and the blower 19. The controller 17 of the present embodiment controls the operations of the various control target devices such that, in the carbon dioxide recovery system 10, a series of control sequences for carbon dioxide recovery, including at least an adsorption mode and a desorption/recovery mode, is executed. Note that the control sequences may include a scavenging mode in addition to the above. The desorption/recovery mode indicates that a desorption mode and a recovery mode are defined as one mode.

Figure 2:
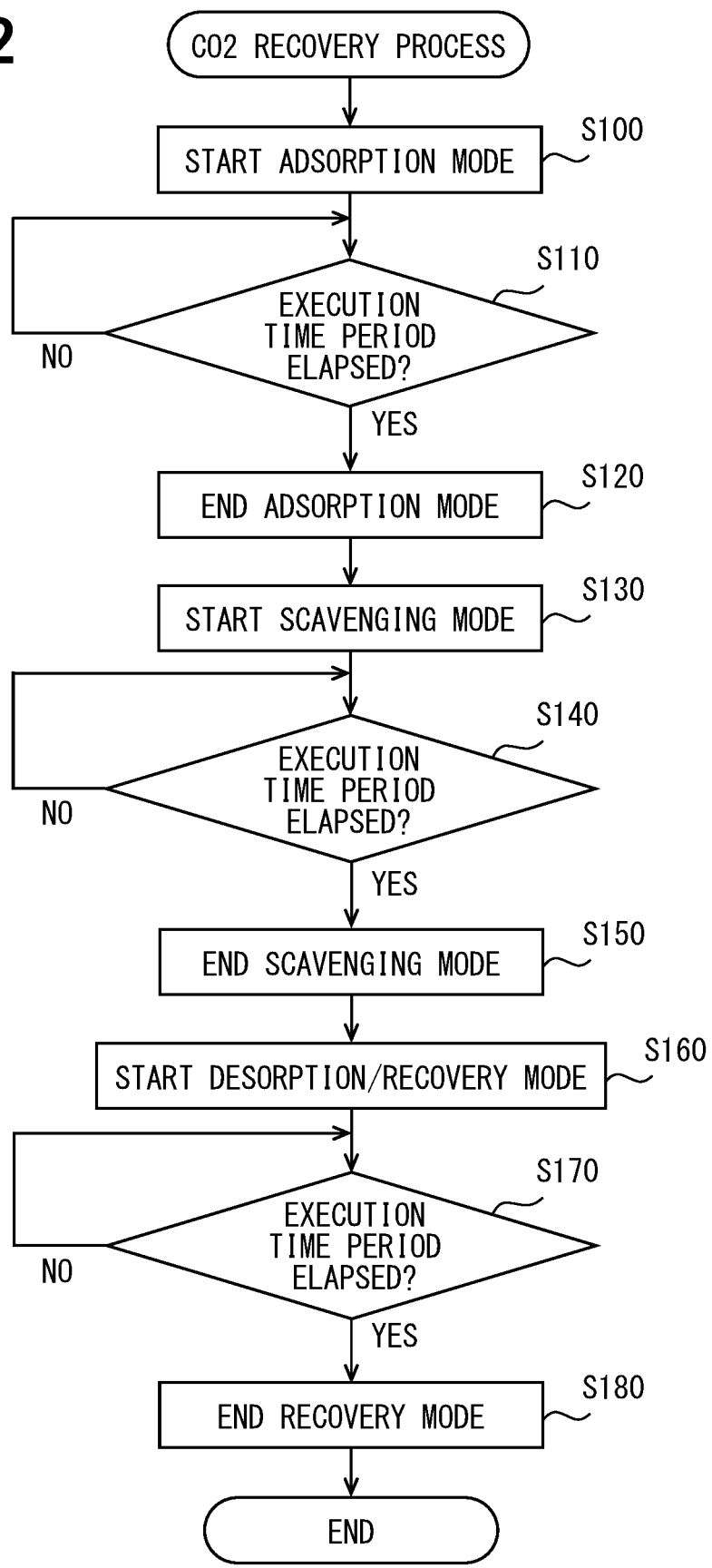
FIG. 2 is a flowchart showing a process in a controller to execute a series of control sequences for carbon dioxide recovery.
Figure 3:
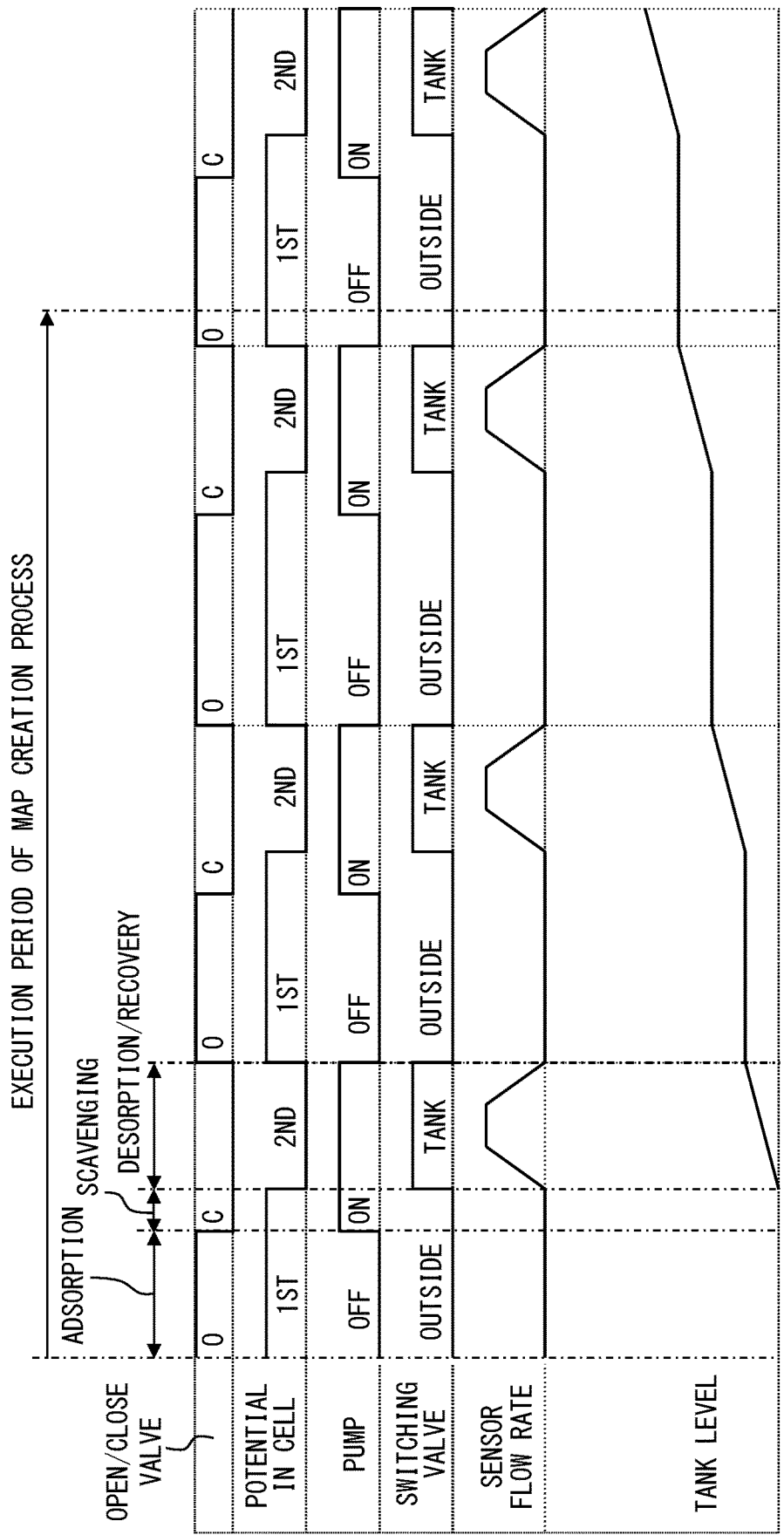
FIG. 3 is a time chart showing operation of each unit when the process shown in the flowchart of FIG. 2 is performed.
Figure 4A:
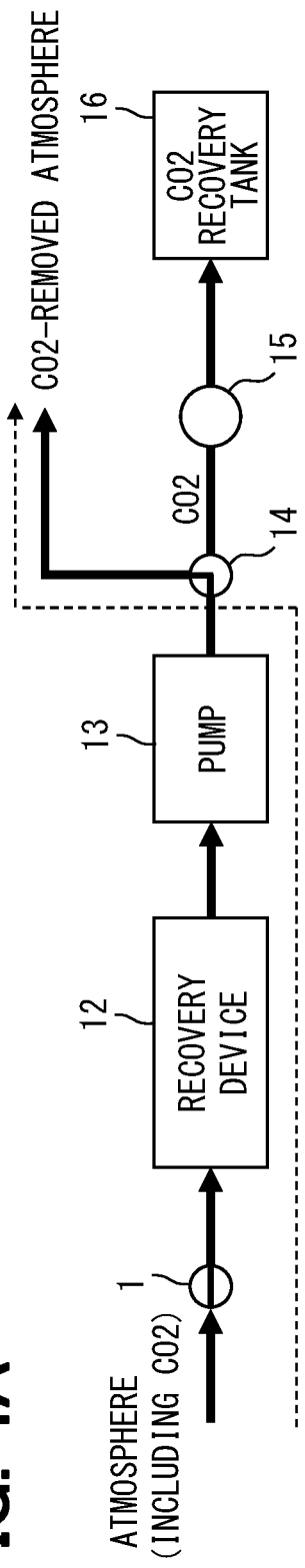
FIG. 4A is an explanatory view for explaining an adsorption mode included in a series of control sequences.
Figure 4B:
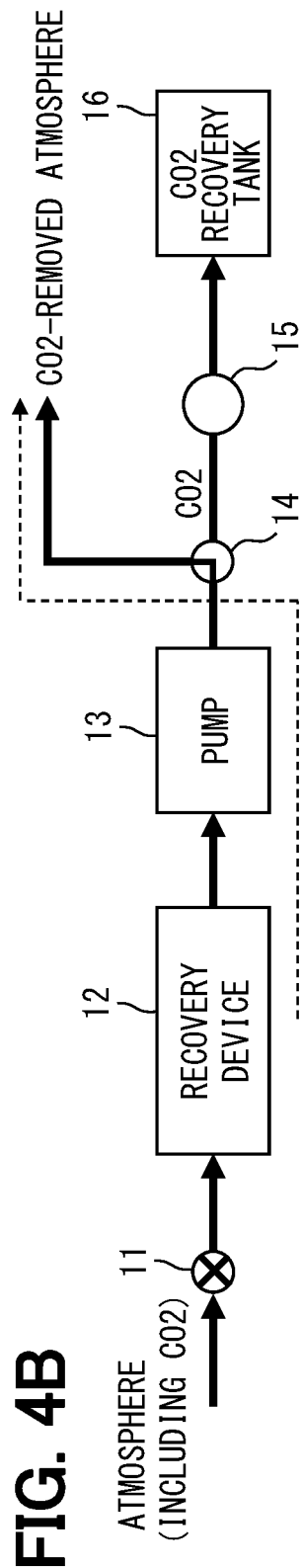
FIG. 4B is an explanatory view for explaining a scavenging mode included in the series of control sequences.
Figure 4C:
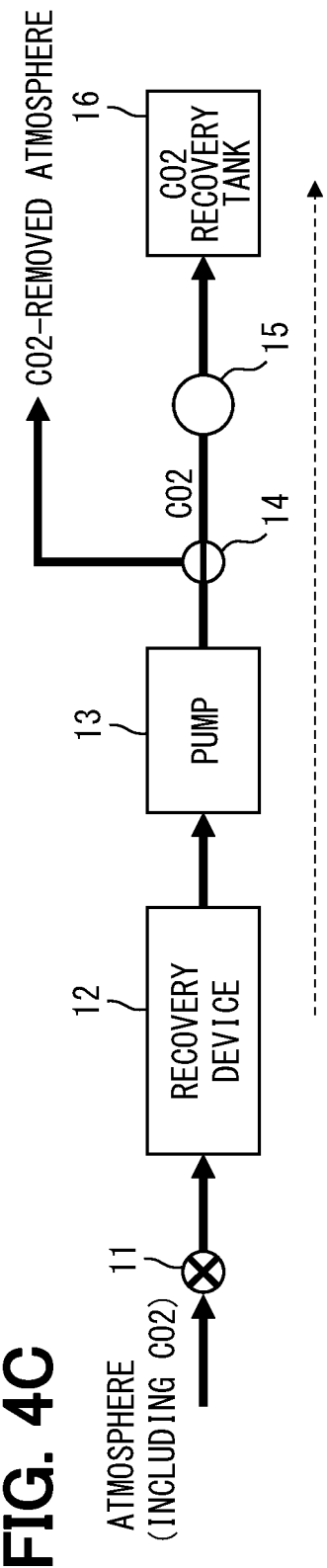
FIG. 4C is an explanatory view for explaining a desorption/recovery mode included in the series of control sequences.

Hereinafter, the series of control sequences for carbon dioxide recovery, including at least an adsorption mode, a scavenging mode, and a desorption/recovery mode, that is executed in the carbon dioxide recovery system 10 will be described. FIG. 2 is a flowchart showing a process performed in the controller 17 to execute the control sequences. FIG. 3 is a time chart showing operation of each unit when the process shown in the flowchart of FIG. 2 is performed. FIGS. 4A to 4C are explanatory views for explaining the adsorption mode, the scavenging mode, and the desorption/recovery mode included in the series of control sequences. The desorption/recovery mode indicates that a desorption mode and a recovery mode are defined as one mode.

As shown in the flowchart of FIG. 2, the controller 17 first starts, in a step S100, the adsorption mode that is the first operation mode of the series of control sequences. In this adsorption mode, the channel open/close valve 11 is opened such that the mixed gas containing carbon dioxide can be introduced into the recovery device 12, as shown in FIG. 3. In a case where the blower 19 is provided, the blower 19 is driven such that more mixed gas is introduced into the recovery device 12. In a case where the pump 13 also serves as the blower 19, the pump 13 is driven to suck the mixed gas, so that the mixed gas is drawn into the recovery device 12 from the outside. In this case, the pump 13 is driven only to suck the mixed gas from the outside, so that the energy required for the suction is less than that required for pump drive for the evacuation in the scavenging mode or the desorption/recovery mode to be described later.

In the adsorption mode, an adsorption potential (corresponding to a first potential), at which the carbon dioxide adsorbent of the working electrode can adsorb carbon dioxide, is applied between the working electrode and the counter electrode of the electrochemical cell of the recovery device 12, as shown in FIG. 3. Furthermore, in the adsorption mode, the channel switching valve 14 is controlled such that the pipe on the downstream side of the pump 13 communicates with the outside, as shown in FIG. 3.

By such control of the channel open/close valve 11, the electrochemical cell of the recovery device 12, the channel switching valve 14, and the like, the mixed gas (atmospheric gas) containing carbon dioxide passes through the channel open/close valve 11 and enters the recovery device 12 in the adsorption mode, as shown by a dotted arrow in FIG. 4A. The carbon dioxide in the mixed gas that has entered the recovery device 12 is adsorbed by the plurality of the electrochemical cells, whereby carbon dioxide is removed from the mixed gas. The mixed gas, from which the carbon dioxide has been removed, passes through the pump 13, is guided to a channel pipe leading toward the outside at the channel switching valve 14, and is discharged to the outside through the channel pipe.

In a step S110 in the flowchart of FIG. 2, the controller 17 determines whether the adsorption mode execution time period has elapsed. The adsorption mode execution time period is not constant but changes for the reasons: for estimating, in the later-described map creation process, a maximum adsorption amount of the electrochemical cell and a maximum adsorption amount time period that is the adsorption mode execution time period to obtain the maximum adsorption amount; for optimizing the carbon dioxide recovery amount and consumed energy if the carbon dioxide adsorption performance of the electrochemical cell changes due to environmental changes or deterioration over time; and for others. This changing adsorption mode execution time period is set by the controller 17. In the step S110, it is determined whether the set adsorption mode execution time period has elapsed. In the present embodiment, the maximum adsorption amount is used as the target carbon dioxide adsorption amount. Therefore, the maximum adsorption amount is also referred to as the target carbon dioxide adsorption amount in the following description. The maximum adsorption amount corresponds to the target adsorption amount.

When it is determined in the determination processing in the step S110 that the set adsorption mode execution time period has elapsed, the process proceeds to a step S120. On the other hand, when it is determined that the set adsorption mode execution time period has not elapsed, the determination processing in the step S110 is repeatedly executed until the adsorption mode execution time period elapses.

In the step S120, adsorption mode end processing is executed. Specifically, the controller 17 closes the channel open/close valve 11 to block the mixed gas that will flow into the recovery device 12 from the outside. In the case where the blower 19 is provided, the controller 17 stops the driving of the blower 19. The controller 17 also resets a count value of a counter that counts the adsorption mode execution time period, and the like.

As described above, the controller 17 applies the adsorption potential during the execution of the adsorption mode in which carbon dioxide is adsorbed, so that the carbon dioxide adsorbent adsorbs carbon dioxide. The controller 17 applies the adsorption potential only during the adsorption mode execution time period corresponding to the target carbon dioxide adsorption amount.

The adsorption mode execution time period can be obtained from the adsorption amount change map data. The target carbon dioxide adsorption amount can be obtained from the recovery amount change map data. The controller 17 acquires, from the recovery amount change map data, the target carbon dioxide adsorption amount associated with the carbon dioxide recovery amount detected through the sensor 15. As shown in FIG. 7, the target carbon dioxide adsorption amount in the recovery amount change map data is a correlation value correlated with the carbon dioxide recovery amount detected through the sensor 15. Therefore, it can be said that the controller 17 acquires, as the target carbon dioxide adsorption amount, a correlation value correlated with the carbon dioxide recovery amount detected through the sensor 15.

Then, the controller 17 acquires the adsorption mode execution time period associated with the target carbon dioxide adsorption amount from the adsorption amount change map data. In the example of FIG. 5, when the target carbon dioxide adsorption amount is set, for example, to 80 [g], the adsorption mode execution time period is 80 [s].

As shown in FIG. 6, the target carbon dioxide adsorption amount is updated according to the carbon dioxide recovery amount detected through the sensor 15. As shown in FIG. 5, the adsorption mode execution time period changes every time the target carbon dioxide adsorption amount is updated. The target carbon dioxide adsorption amount may be stored in the storage unit 18 or the like as an initially calculated threshold value or an updated threshold value.

In a step S130, the controller 17 starts the scavenging mode that is the second operation mode of the series of control sequences. In this scavenging mode, the channel open/close valve 11 remains closed, as shown in FIG. 3. The adsorption potential applied between the working electrode and the counter electrode of the electrochemical cell of the recovery device 12 is maintained as it is. The communication between the pipe on the downstream side of the pump 13 and the outside by the channel switching valve 14 is also maintained.

In the scavenging mode, driving of the pump 13 is started as shown in FIG. 3. As described above, the channel open/close valve 11 is closed, so that the recovery device 12 is in a sealed state on the upstream side of the pump 13. When the pump 13 is driven in this state, the residual mixed gas left in the sealed recovery device 12, from which the carbon dioxide has been removed, is sucked from the inside of the recovery device 12 and discharged to the outside. As a result, the residual mixed gas in the recovery device 12 can be scavenged. In the scavenging mode, the adsorption potential is applied.

Since the recovery device 12 on the upstream side of the pump 13 is sealed, the scavenging of the residual mixed gas in the recovery device 12 is performed by evacuation by the pump 13. Therefore, for example, in the case where the pump 13 also serves as the blower 19, the driving of the pump 13 is continued, but the drive output thereof is made higher than that in an intake mode by the start of the scavenging mode.

By such control of the channel open/close valve 11, the electrochemical cell of the recovery device 12, the pump 13, and the channel switching valve 14 in the scavenging mode, the residual mixed gas in the recovery device 12, from which the carbon dioxide has been removed, passes through the pump 13, is guided to the channel pipe leading toward the outside at the channel switching valve 14, and is discharged to the outside through the channel pipe, as shown by a dotted arrow in FIG. 4B.

In a step S140 in the flowchart of FIG. 2, the controller 17 determines whether a scavenging mode execution time period has elapsed. The scavenging mode execution time period is predetermined to a time period sufficient to scavenge the residual mixed gas in the recovery device 12.

When it is determined in the determination processing in the step S140 that the predetermined scavenging mode execution time period has elapsed, the process proceeds to a step S150. On the other hand, when it is determined that the set scavenging mode execution time period has not elapsed, the determination processing in the step S140 is repeatedly executed until the scavenging mode execution time period elapses.

In the step S150, scavenging mode end processing is executed. Specifically, the controller 17 resets a count value of a counter that counts the scavenging mode execution time period, and the like.

In a step S160, the controller 17 starts the desorption/recovery mode that is the third operation mode of the series of control sequences. In this desorption/recovery mode, the channel open/close valve 11 is maintained in a closed state, as shown in FIG. 3. In addition, the pump 13 sucks the carbon dioxide desorbed from the electrochemical cell in a state closer to a vacuum than the atmosphere, so that the driving by the drive output equivalent to that in the scavenging mode is continued.

On the other hand, a desorption potential (corresponding to a second potential), at which the carbon dioxide adsorbed by the carbon dioxide adsorbent of the working electrode can be desorbed by releasing electrons from the working electrode, is applied between the working electrode and the counter electrode of the electrochemical cell of the recovery device 12. Furthermore, in the desorption/recovery mode, the channel switching valve 14 is controlled to cause the pipe on the downstream side of the pump 13 to communicate with the $CO_2$ recovery tank 16, as shown in FIG. 3.

By such control of the channel open/close valve 11, the electrochemical cell of the recovery device 12, the pump 13, and the channel switching valve 14 in the desorption/recovery mode, the carbon dioxide desorbed from the electrochemical cell passes through the pump 13, is guided to a channel pipe leading toward the $CO_2$ recovery tank 16 at the channel switching valve 14, and is accumulated in the $CO_2$ recovery tank 16 through the channel pipe, as shown by a dotted arrow in FIG. 4C. At this time, the concentration and flow rate of the carbon dioxide flowing through the channel pipe toward the $CO_2$ recovery tank 16 are detected by the sensor 15. Based on the detection results by the sensor 15, the controller 17 can calculate the recovery amount of the carbon dioxide recovered in the $CO_2$ recovery tank 16 by executing the series of control sequences. The concentration of the carbon dioxide flowing through the channel pipe toward the $CO_2$ recovery tank 16 is usually close to 100%. Therefore, a sensor 15 capable of detecting a flow rate of carbon dioxide may be used.

In the desorption/recovery mode, instead of simultaneous performing of the desorption/recovery of the carbon dioxide, priority may be given to the desorption of the carbon dioxide from the electrochemical cell, and after a predetermined time period has elapsed from the desorption of the carbon dioxide, the recovery of the desorbed carbon dioxide may be started. That is, by separating the desorption mode and the recovery mode and delaying the execution start time of the recovery mode from the execution start time of the desorption mode, the execution time period of the recovery mode may be shortened from the execution time period of the desorption mode. In this case, the driving of the pump 13 is temporarily stopped at the start of the desorption mode. Then, while the pump 13 is stopped, the desorption potential is applied between the working electrode and the counter electrode of the electrochemical cell to desorb carbon dioxide from the carbon dioxide adsorbent of the working electrode. In a state where a predetermined time period has elapsed from the start of the desorption mode and the desorption of the carbon dioxide has progressed to some extent, the recovery mode is started and the pump 13 is driven again. As a result, the pump 13 only needs to be driven in the recovery mode, so that the pump 13 can be efficiently driven. However, even in the recovery mode in which the pump 13 is driven, the desorption potential is applied between the working electrode and the counter electrode of the electrochemical cell, and the desorption of the carbon dioxide from the electrochemical cell is continued.

In a step S170 in the flowchart of FIG. 2, the controller 17 determines whether a desorption/recovery mode execution time period or a recovery mode execution time period (hereinafter, it is described as a recovery mode execution time period) has elapsed. The recovery mode execution time period is not constant but changes for the reasons: for optimizing the carbon dioxide recovery amount and consumed energy if the carbon dioxide adsorption performance of the electrochemical cell changes due to environmental changes or deterioration over time; and for others. The changing recovery mode execution time period is set by the controller 17. In the step S170, it is determined whether the set recovery mode execution time period has elapsed.

When it is determined in the determination processing in the step S170 that the set recovery mode execution time period has elapsed, the process proceeds to step a S180. On the other hand, when it is determined that the set recovery mode execution time period has not elapsed, the determination processing in the step S170 is repeatedly executed until the recovery mode execution time period elapses. As described above, the controller 17 applies the desorption potential during the execution of the recovery mode in which carbon dioxide is recovered, so that the carbon dioxide adsorbed by the carbon dioxide adsorbent is desorbed. Then, the controller 17 applies the desorption potential only during the recovery mode execution time period corresponding to the target carbon dioxide adsorption amount. The recovery mode execution time period corresponds to a recovery time period.

In the step S180, recovery mode end processing is executed. Specifically, the controller 17 opens the channel open/close valve 11 to cause the recovery device 12 to communicate with the outside. The controller 17 stops the application of the desorption potential to the electrochemical cell. The controller 17 stops the driving of the pump 13. The controller 17 switches the channel switching valve 14 to cause the pipe on the downstream side of the pump 13 to communicate with the outside. Furthermore, the controller 17 also resets a count value of a counter that counts the recovery mode execution time period, and the like.

Here, it is considered that the carbon dioxide adsorption performance of the electrochemical cell changes due to deterioration over time or the like. However, an upper limit amount that the electrochemical cell can adsorb carbon dioxide cannot be directly detected. Therefore, it cannot be denied the possibility that the execution of the adsorption mode may be continued even though the carbon dioxide adsorption amount of the electrochemical cell reaches the upper limit, or the execution of the recovery mode may be continued even though the recovery of the carbon dioxide desorbed from the electrochemical cell is substantially finished.

As described above, for example, if the adsorption mode is always executed for a time period sufficient to adsorb the upper limit amount of carbon dioxide that can be adsorbed by the electrochemical cell and the recovery mode is executed for a time period sufficient to recover all the carbon dioxide adsorbed by the electrochemical cell in order to maximize the recovery amount of carbon dioxide, there is the possibility that, in the carbon dioxide recovery system 10, excessive energy may be consumed with respect to the recovery amount of carbon dioxide.

Therefore, the carbon dioxide recovery system 10 according to the present embodiment has a configuration in which the adsorption amount change map data and the recovery amount change map data are stored in the storage unit 18 of the controller 17.

Figure 8:
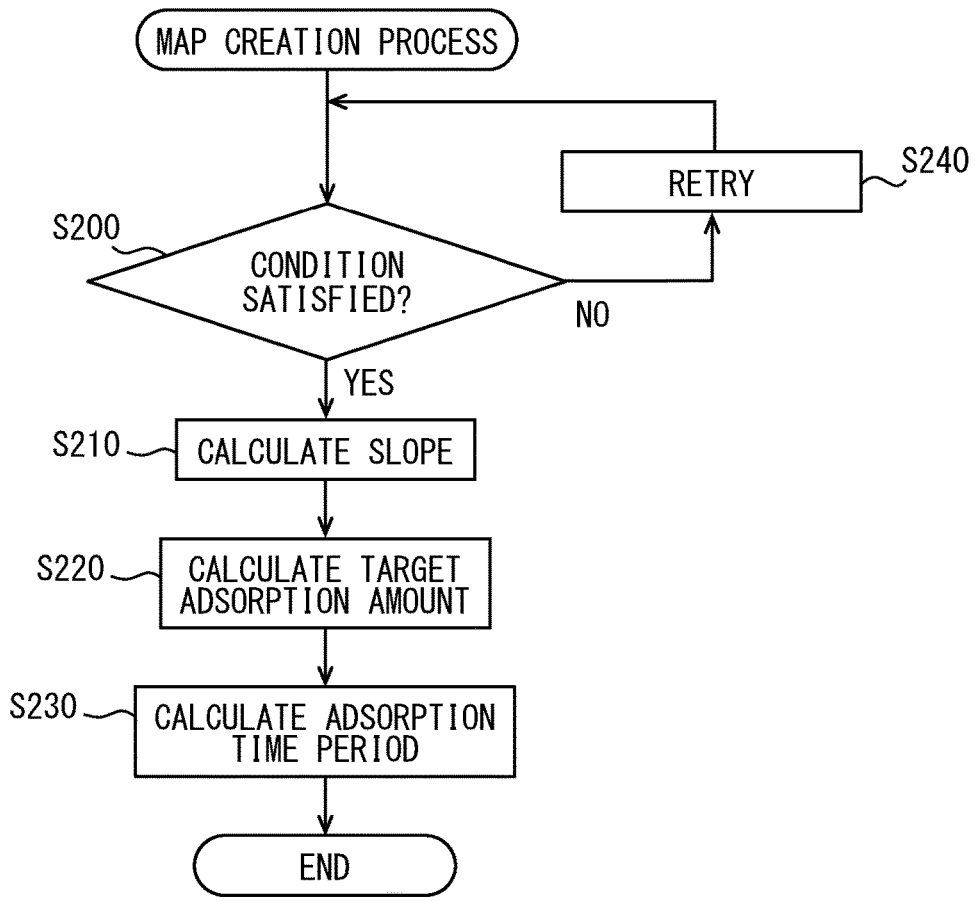
FIG. 8 is a flowchart showing a map creation process for creating the adsorption amount change map data.

Hereinafter, the adsorption amount change map data and the recovery amount change map data will be described in detail. First, a map creation process of creating the adsorption amount change map data will be described based on the flowchart of FIG. 8.

When performing the map creation process, the controller 17 causes multiple times of the adsorption mode to be executed at different adsorption mode execution time periods (elapsed time periods), and detects, through the sensor 15, the carbon dioxide recovery amounts in multiple times of the recovery mode executed corresponding to each adsorption mode. For example, FIG. 3 shows an example in which three times of adsorption mode are executed at different adsorption mode execution time periods. The number of times of execution of the multiple times of the adsorption mode may be two.

In FIG. 3, the execution time period of the first adsorption mode is set to be relatively short such that the carbon dioxide adsorption amount of the electrochemical cell does not reach the upper limit value. Therefore, the carbon dioxide recovery amount, detected when the recovery mode corresponding to the first adsorption mode is executed, is an amount less than the upper limit value of the carbon dioxide adsorption amount of the electrochemical cell.

The execution time period of the second adsorption mode is set to be relatively long such that the carbon dioxide adsorption amount of the electrochemical cell reaches substantially the upper limit value. Therefore, the carbon dioxide recovery amount, detected when the recovery mode corresponding to the second adsorption mode is executed, is an amount substantially equal to the upper limit value of the carbon dioxide adsorption amount of the electrochemical cell.

The execution time period of the third adsorption mode is set to be the longest such that, even after the carbon dioxide adsorption amount of the electrochemical cell reaches the upper limit value, the adsorption mode is executed for a certain period of time. Therefore, the carbon dioxide recovery amount, detected when the recovery mode corresponding to the third adsorption mode is executed, is an amount equal to the upper limit value of the carbon dioxide adsorption amount of the electrochemical cell.

Based on the sensor detection results during the execution of the multiple times of the adsorption mode and the multiple times of the recovery mode corresponding to the each adsorption mode, a maximum adsorption amount of the electrochemical cell and a maximum adsorption amount time period, which is an adsorption mode execution time period to obtain the maximum adsorption amount, are estimated. A specific example of a method for estimating the maximum adsorption amount of the electrochemical cell and the maximum adsorption amount time period will be described with reference to FIGS. 9A, 9B, and 9C.

In a step S200, it is determined whether a map creation determination condition is satisfied. The map creation determination condition is satisfied when the carbon dioxide recovery amounts in the three recovery modes can be plotted for a single piece of the adsorption amount change map data, and a non-plotted maximum value of the carbon dioxide recovery amount exists on the same straight line. The same straight line may include a tolerance. When the controller 17 determines that the map creation determination condition is satisfied, the process proceeds to a step S210. When the controller 17 determines that the map creation determination condition is not satisfied, the process proceeds to a step S240.

In the step S240, retry is performed. The controller 17 causes the adsorption mode to be executed again, and detects, through the sensor 15, the carbon dioxide recovery amount in the recovery mode executed corresponding to the adsorption mode. At this time, the controller 17 sets the execution time period of the adsorption mode to be longer than the last time (third time).

Then, the controller 17 performs S200 using the carbon dioxide recovery amount obtained in the retry. The controller 17 repeatedly executes the steps S200 and S240 until YES is determined in the step S200. When the step S240 is executed, the controller 17 adopts, in a step S220, the carbon dioxide recovery amount at the time of the retry as the target carbon dioxide adsorption amount.

Figure 9A:
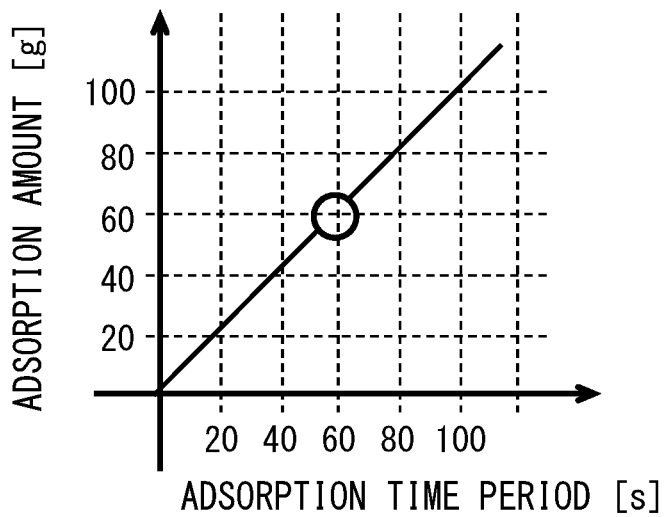
FIG. 9A is an explanatory graph for determining an increasing gradient line in estimation of a maximum adsorption amount of an electrochemical cell and a maximum adsorption amount time period.

In the step S210, a slope is calculated. FIG. 9A is a graph showing, based on the carbon dioxide recovery amount detected when the recovery mode corresponding to the first adsorption mode is executed, the carbon dioxide adsorption amount of the electrochemical cell and the execution time period of the first adsorption mode. The carbon dioxide adsorption amount of the electrochemical cell can be regarded as equal to the detected carbon dioxide recovery amount. As described above, the execution time period of the first adsorption mode is set to be relatively short such that the carbon dioxide adsorption amount of the electrochemical cell does not reach the upper limit value. Therefore, by assuming, based on the carbon dioxide adsorption amount of the electrochemical cell when the first adsorption mode is executed, that as the execution time period of the adsorption mode becomes longer, the carbon dioxide adsorption amount also linearly increases, an increasing gradient line (slope) can be determined, as shown in FIG. 9A.

Figure 9B:
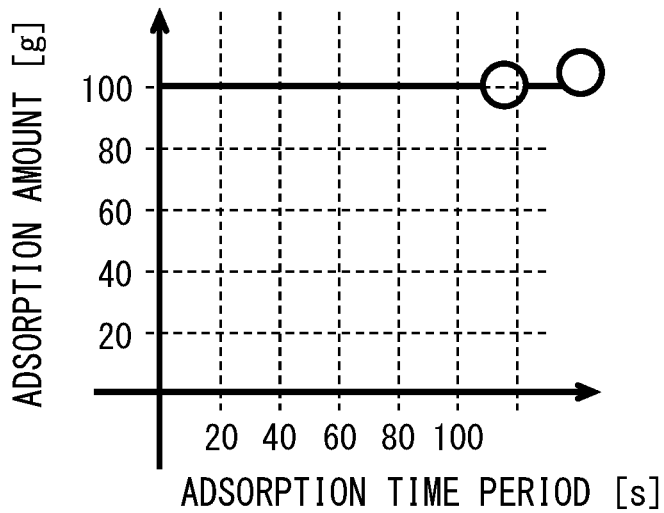
FIG. 9B is an explanatory graph for determining an upper limit line of an carbon dioxide adsorption amount in the estimation.

In the step S220, the target carbon dioxide adsorption amount is calculated. FIG. 9B is a graph showing, based on the carbon dioxide recovery amount detected when the recovery mode corresponding to each of the second and third adsorption modes is executed, the carbon dioxide adsorption amount of the each electrochemical cell and the execution time period of each of the second and third adsorption modes. As described above, the execution time period of the second adsorption mode is set to be relatively long such that the carbon dioxide adsorption amount of the electrochemical cell reaches substantially the upper limit value, and the execution time period of the third adsorption mode is set to be the longest such that, even after the carbon dioxide adsorption amount of the electrochemical cell reaches the upper limit value, the adsorption mode is executed for a certain period of time. Therefore, based on the carbon dioxide adsorption amount of the electrochemical cell when each of the second and third adsorption modes is executed, an upper limit line of the carbon dioxide adsorption amount of the electrochemical cell can be determined, as shown in FIG. 9B. The carbon dioxide adsorption amount corresponding to the upper limit line is the target carbon dioxide adsorption amount that is the maximum adsorption amount that can be adsorbed.

The upper limit line of the carbon dioxide adsorption amount of the electrochemical cell may be determined based on the carbon dioxide adsorption amount of the electrochemical cell that can be obtained through the execution of one time of the adsorption mode and the recovery mode corresponding to the one time of the adsorption mode.

Figure 9C:
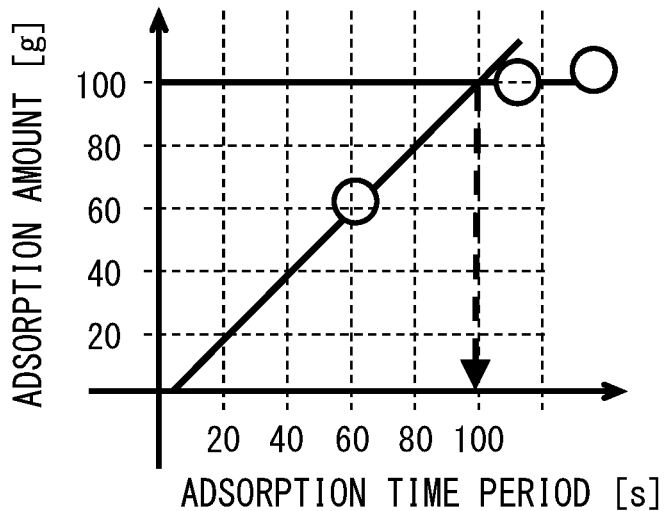
FIG. 9C is an explanatory graph for determining an intersection between the increasing gradient line and the upper limit line in the estimation.

In a step S230, the adsorption time period, which is the maximum adsorption amount time period that is the adsorption mode execution time period corresponding to the maximum adsorption amount, can be determined from the intersection between the increasing gradient line in FIG. 9A and the upper limit line in FIG. 9B, as shown in FIG. 9C.

As described above, the controller 17 creates, based on the carbon dioxide recovery amounts that are the detection results in the multiple times of the recovery mode, the adsorption-amount change map data by estimating the maximum adsorption amount of the electrochemical cell as the target carbon dioxide adsorption amount and estimating the adsorption time period corresponding to the maximum adsorption amount. Then, the controller 17 stores the created adsorption amount change map data in the storage unit 18. In the adsorption amount change map data, the target carbon dioxide adsorption amount and the adsorption time period are updated due to deterioration over time or the like of the electrochemical cell.

Figure 10:
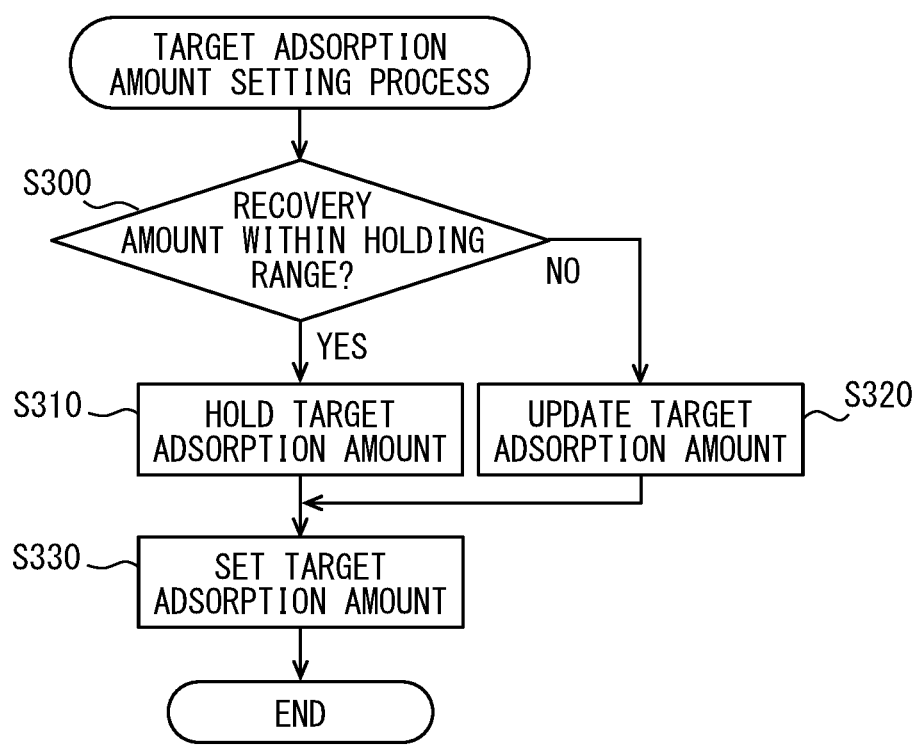
FIG. 10 is a flowchart showing a setting process for a target carbon dioxide adsorption amount.

Next, a setting process for the target carbon dioxide adsorption amount in the recovery amount change map data will be described based on the flowchart of FIG. 10. The controller 17 executes the flowchart of FIG. 10 to determine whether the target carbon dioxide adsorption amount is maintained to the current value or updated.

In the recovery amount change map data, a different target carbon dioxide adsorption amount is associated every number of cycles of multiple times of the control sequences, as shown in FIGS. 6 and 7. Here, an example is adopted in which the target carbon dioxide adsorption amount is updated every 10 cycles. In the recovery amount change map data, the carbon dioxide recovery amount (carbon dioxide monitor value) detected through the sensor 15 is associated with the target carbon dioxide adsorption amount.

The initially calculated threshold value is an initial target carbon dioxide adsorption amount adopted from the first cycle to the 10th cycle. The updated threshold value is an updated target carbon dioxide adsorption amount. The updated threshold value is a target carbon dioxide adsorption amount assumed due to deterioration over time or the like of the electrochemical cell. Therefore, the updated threshold value is a value smaller than the initially calculated threshold value. In addition, the updated threshold value becomes a smaller value as the number of the cycles increases.

In addition, adsorption amount holding ranges are between the initially calculated threshold value and the updated threshold value and between the updated threshold value and the next updated threshold value. The adsorption amount holding range is a range where the current target carbon dioxide adsorption amount is held. On the other hand, a range out of the adsorption amount holding range is an adsorption amount update range. The adsorption amount update range is a range where the target carbon dioxide adsorption amount is updated from the current value.

In a step S300, it is determined whether the recovery amount is within the adsorption amount holding range. The controller 17 determines whether the carbon dioxide monitor value as the recovery amount is within the adsorption amount holding range. When the controller 17 determines that the carbon dioxide monitor value is within the adsorption amount holding range, the process proceeds to a step S310. When the controller 17 determines that the carbon dioxide monitor value is not within the adsorption amount holding range, the process proceeds to a step S320.

In the step S310, the target carbon dioxide adsorption amount is held. The controller 17 holds the current target carbon dioxide adsorption amount. In the case of the carbon dioxide monitor value indicated by dot hatching in FIG. 7, the controller 17 holds the current target carbon dioxide adsorption amount.

In the step S320, the target carbon dioxide adsorption amount is updated. The controller 17 updates the current target carbon dioxide adsorption amount to a new target carbon dioxide adsorption amount. In the case of the carbon dioxide monitor value indicated by diagonal hatching in FIG. 7, the controller 17 updates the target carbon dioxide adsorption amount.

In a step S330, a target carbon dioxide adsorption amount is set. The controller 17 sets the current target carbon dioxide adsorption amount or the updated target carbon dioxide adsorption amount as the target carbon dioxide adsorption amount when the adsorption mode execution time period is set. As described above, the controller 17 sets the target carbon dioxide adsorption amount from the carbon dioxide recovery amount.

As described above, the carbon dioxide recovery system 10 includes the controller 17 that detects, through the sensor 15, the recovery amount of the carbon dioxide recovered from the recovery device 12 to the $CO_2$ recovery tank 16. Then, the controller 17 acquires, as the target carbon dioxide adsorption amount, a correlation value correlated with the carbon dioxide recovery amount as a detection result through the sensor 15. Therefore, the carbon dioxide recovery system 10 can grasp the target carbon dioxide adsorption amount.

In addition, the controller 17 causes multiple times of the adsorption mode to be executed, and grasps the target carbon dioxide adsorption amount using the adsorption amount change map data created using the carbon dioxide recovery amounts detected through the sensor 15 in multiple times of the recovery mode executed corresponding to each adsorption mode. Then, the controller 17 applies the adsorption potential only during the adsorption mode execution time period obtained from the adsorption amount change map data. Therefore, the controller 17 can apply the adsorption potential only for a time period required to obtain the maximum adsorption amount. In other words, the controller 17 can suppress application of the adsorption potential for a time period longer than the time period required to obtain the maximum adsorption amount. Therefore, the controller 17 can appropriately control the application time period of the adsorption potential to obtain the maximum adsorption amount.

Since the controller 17 updates the adsorption amount change map data according to the carbon dioxide recovery amount detected through the sensor 15, it is possible to grasp the optimum target carbon dioxide adsorption amount and appropriately control the application time period of the adsorption potential even if the electrochemical cell deteriorates over time.

Although the preferred embodiments of the present disclosure have been described above, the present disclosure is not limited to the above embodiments at all, and various modifications can be made without departing from the gist of the present disclosure. For example, the configuration of the above embodiment may be modified as follows.

(First Modification)

The adsorption mode execution time period is not limited to that obtained from the adsorption amount change map data. The adsorption mode execution time period can also be obtained by calculating a predetermined relational expression. The controller 17 may obtain the adsorption mode execution time period by multiplying the carbon dioxide recovery amount [g] detected through the sensor 15 by a carbon dioxide adsorption coefficient [s/g].

The carbon dioxide adsorption coefficient is a coefficient indicated by a time period required for the carbon dioxide adsorbent to adsorb a predetermined amount of carbon dioxide. That is, the carbon dioxide adsorption coefficient is defined as a time period required to adsorb 1 [g] of carbon dioxide. The carbon dioxide adsorption coefficient [s/g] is adsorption time period [s]/carbon dioxide adsorption amount [g]. The first modification can achieve the same effects as those of the above embodiment.

(Second Modification)

Figure 11:
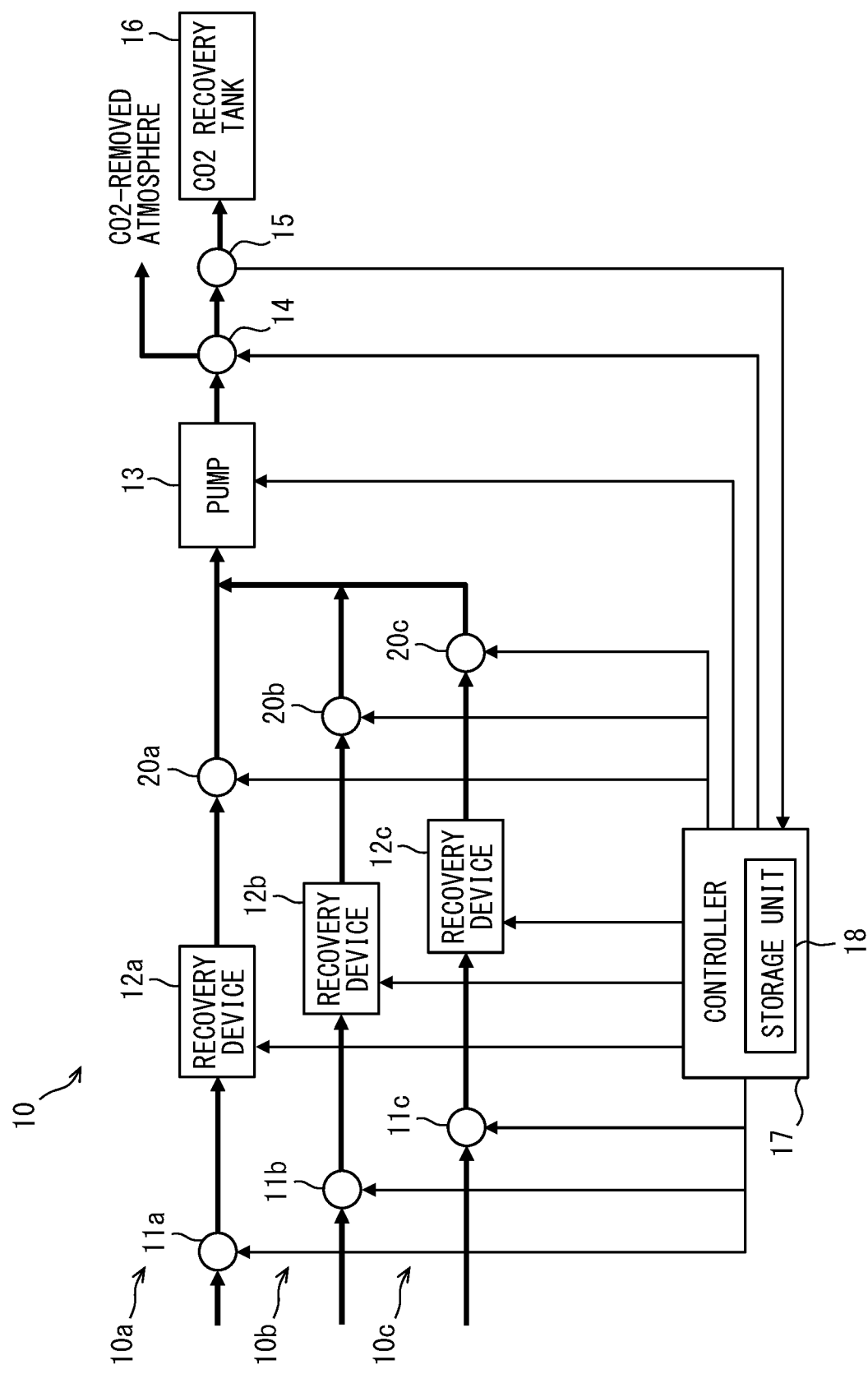
FIG. 11 is a view showing a configuration of a carbon dioxide recovery system according to a modification.

As shown in FIG. 11, the carbon dioxide recovery system 10 may include a plurality of recovery devices 12a to 12c, and the plurality of recovery devices 12a to 12c may be connected in parallel for the $CO_2$ recovery tank 16. That is, the carbon dioxide recovery system 10 may include a plurality of subsystems 10a to 10c. Each of the subsystems 10a to 10c includes one of the recovery devices 12a to 12c.

The subsystem 10a includes a channel open/close valve 11a and a switching valve 20a in addition to the recovery device 12a. The subsystem 10b includes a channel open/close valve 11b and a switching valve 20b in addition to the recovery device 12b. The subsystem 10c includes a channel open/close valve 11c and a switching valve 20c in addition to the recovery device 12c. Note that, here, an example including the three subsystems 10a to 10c is adopted as an example. However, the carbon dioxide recovery system 10 may include two subsystems or four or more subsystems.

The controller 17 can execute an individual mode (i.e. individual recovery mode) in which carbon dioxide is recovered individually from the electrochemical cell of each of the plurality of recovery devices 12a to 12c and execute a simultaneous mode (i.e. simultaneous recovery mode) in which carbon dioxide is recovered simultaneously from the respective electrochemical cells of at least two or more of the recovery devices.

Figure 12:
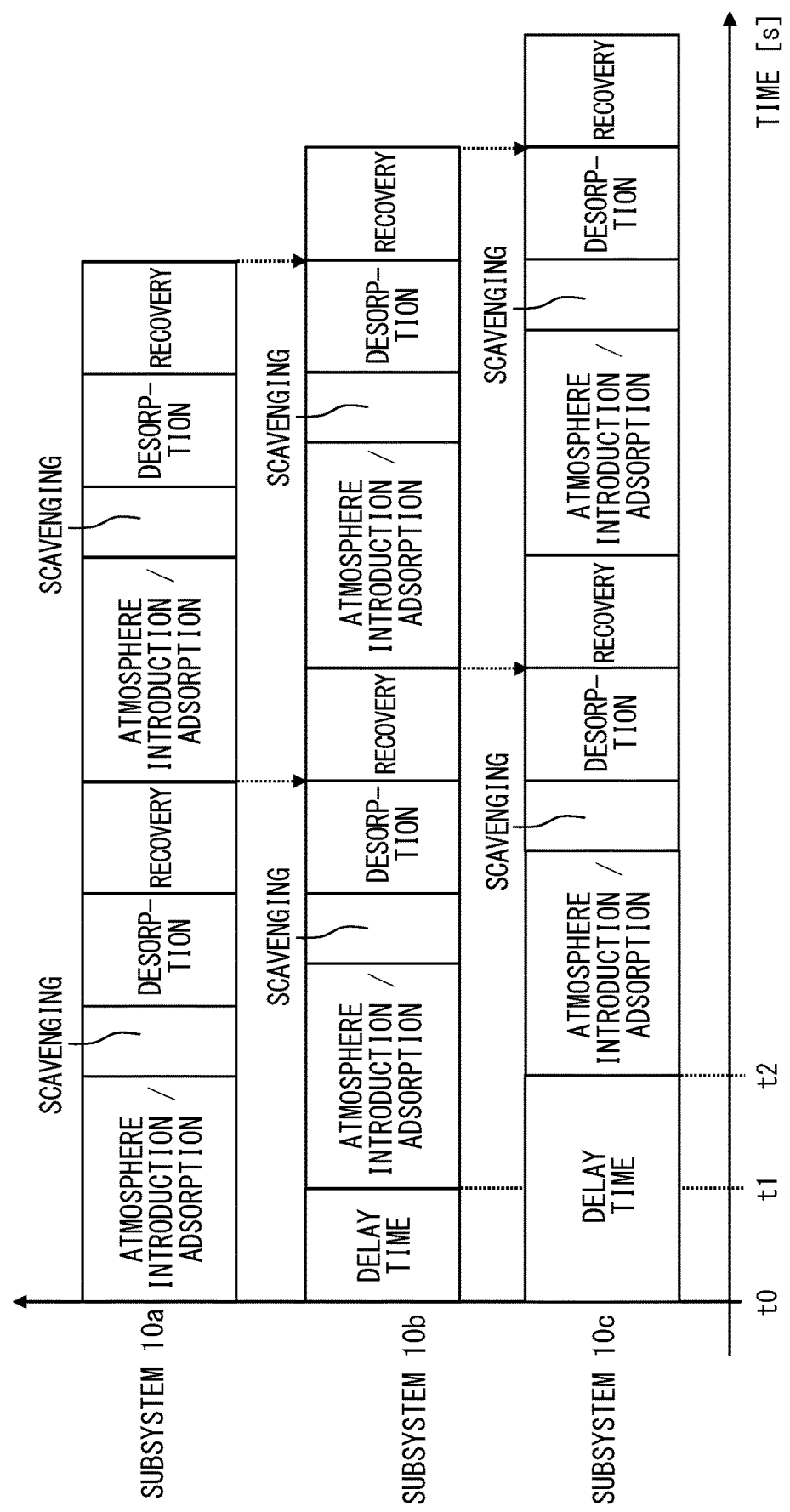
FIG. 12 is a time chart showing control sequences of the carbon dioxide recovery system according to the modification.

In the individual mode, the controller 17 causes a series of control sequences, including the adsorption mode and the recovery mode targeting each electrochemical cell of each of the recovery devices 12a to 12c, to be started at different times, as shown in FIG. 12. A timing t0 is defined, for example, as a start timing of the carbon dioxide recovery system 10. The controller 17 starts the control sequences in the subsystem 10a at the timing t0. The controller 17 starts the control sequences in the subsystem 10b at a timing t1 when a predetermined time period has elapsed from the timing t0. The controller 17 starts the control sequences in the subsystem 10c at a timing t2 when a predetermined time period has elapsed from the timing t1.

Therefore, in the individual mode, a delay time period occurs during which each of the subsystems 10a to 10c does not execute the control sequences. In the subsystem 10b, the period between the timing t0 and the timing t1 is the delay time period. In the subsystem 10c, the period between the timing t0 and the timing t2 is the delay time period. The delay time period corresponds to a period during which the control sequences are not executed. Therefore, the controller 17 causes, during the delay time period, the adsorption mode and the recovery mode for estimating the maximum adsorption amount to be executed. As a result, the carbon dioxide recovery system 10 can effectively utilize the delay time period.

On the other hand, in the simultaneous mode, the controller 17 causes a series of the control sequences, including the adsorption mode and the recovery mode targeting each electrochemical cell of each of the recovery devices 12a to 12c, to be started at the same time. In the subsystems 10a to 10c, the control sequences are started simultaneously, for example, at the timing t0. Therefore, no delay time period occurs in the simultaneous mode.

In addition, the controller 17 may switch between the individual mode and the simultaneous mode according to a situation. The controller 17 switches the mode for the purpose of shortening the creation time period of the adsorption amount change map data, or the like.

Examples of the situation include: an initial operation of the carbon dioxide recovery system 10 (at the time of installation of equipment); a periodic state transition, from a dormant state to an operating state, of the carbon dioxide recovery system 10; periodic maintenance; return from a failure of the carbon dioxide recovery system 10; return from an external environmental abnormality of the carbon dioxide recovery system 10; and the like. Furthermore, in the periodic maintenance, the following situations are considered in which: no electrochemical cell is replaced; some electrochemical cells are replaced; and all electrochemical cells are replaced. The external environmental abnormality is a power failure or the like.

The controller 17 executes the individual mode at the time of the installation of equipment and at the time of the return from a failure, and executes the simultaneous mode at the time of the state transition from a dormant state to an operating state and at the time of the return from the external environmental abnormality. In addition, the controller 17 executes the simultaneous mode when no electrochemical cell is replaced and when some electrochemical cells are replaced, and executes the individual mode when all electrochemical cells are replaced.

Furthermore, in the individual mode, the controller 17 may use common adsorption amount change map data for the subsystems 10a to 10c. On the other hand, in the simultaneous mode, the controller 17 may use individual adsorption amount change map data for each of the subsystems 10a to 10c.

The carbon dioxide recovery system 10 may be configured to be able to execute only one of the individual mode and the simultaneous mode.

Second Embodiment

A carbon dioxide recovery system 10 according to a second embodiment will be described with reference to FIGS. 13 to 16. Here, differences from the above embodiment will be described. A carbon dioxide recovery system 10 of the second embodiment is different from that of the above embodiment mainly in that a plurality of pieces of adsorption amount change map data are stored in the storage unit 18, and these are switched (selected). The carbon dioxide recovery system 10 of the second embodiment has the same components as those of the above embodiment, and is configured to be able to execute the processes described in the above embodiment. In other words, the carbon dioxide recovery system 10 of the second embodiment can be implemented in combination with the above embodiment. FIG. 16 is a time chart showing a normal operating state after the map creation process of FIG. 3 is completed. The normal operating state is a state in which carbon dioxide is actually recovered.

Figure 15:
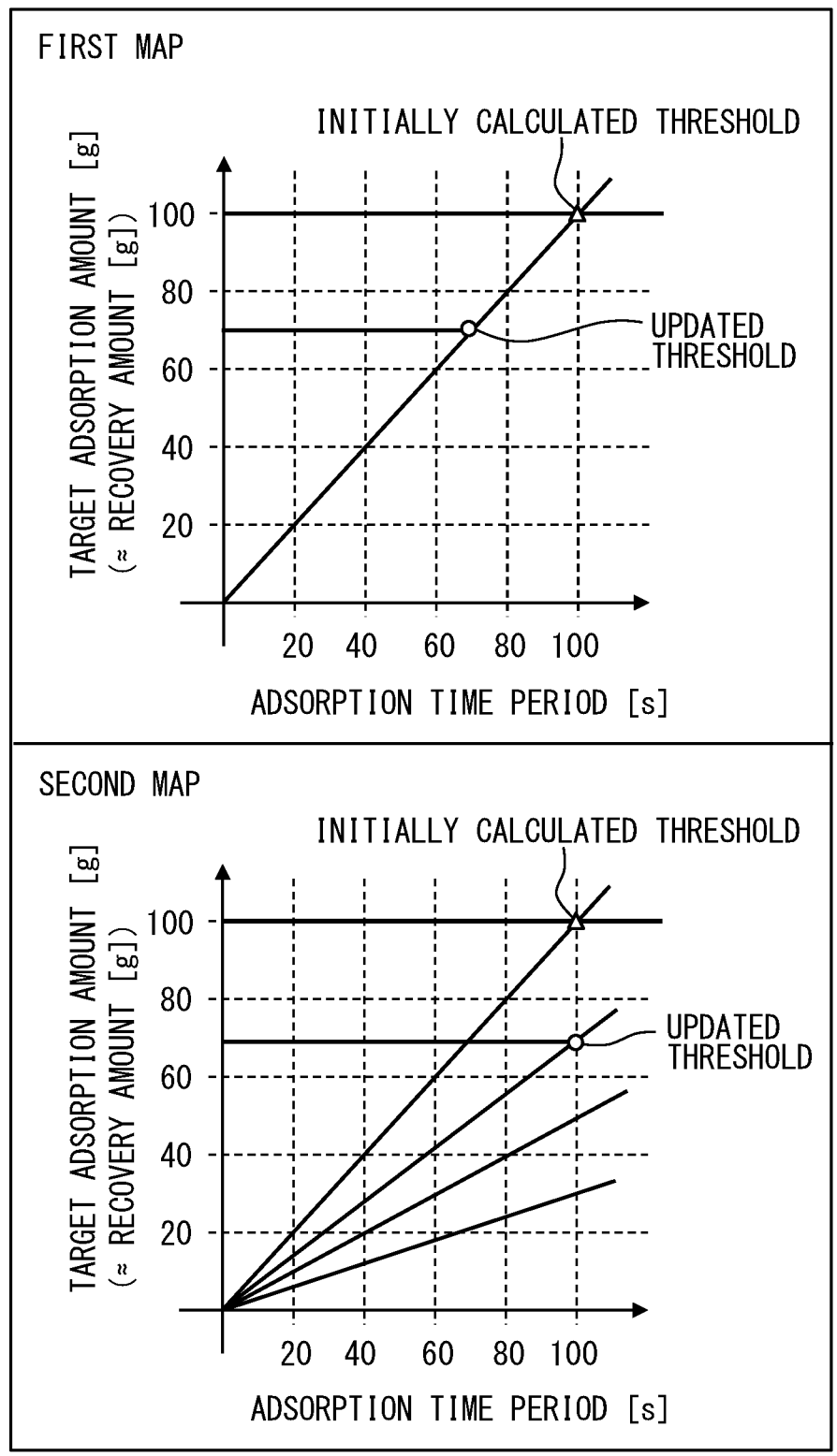
FIG. 15 is graphs showing a first map and a second map according to the second embodiment.

As illustrated in FIG. 15, the storage unit 18 stores a first map and a second map as the adsorption amount change map data. The first map is similar to the adsorption amount change map data of the above embodiment. That is, in the first map, the slope of the increasing gradient line does not change. Therefore, in the first map, the adsorption time period (adsorption mode execution time period) decreases as the target carbon dioxide adsorption amount decreases. On the other hand, the second map is different from the first map in that the slope of the increasing gradient line changes. Therefore, in the second map, the adsorption time period is constant regardless of the decrease in the target carbon dioxide adsorption amount. As described above, the first map and the second map have different adsorption time periods associated with the same target carbon dioxide adsorption amount. It can also be said that the first map and the second map have different adsorption time periods associated with the decreased target carbon dioxide adsorption amount. The first map corresponds to first adsorption amount change data. On the other hand, the second map corresponds to second adsorption amount change data.

As illustrated in FIG. 16, the controller 17 switches (selects) an in-use map used to acquire the adsorption time period between the first map and the second map. Then, the controller 17 stores information indicating the current in-use map. The controller 17 stores, as the information indicating the in-use map, either in-use map information indicating that the first map is in use or in-use map information indicating that the second map is in use. That is, the controller 17 updates the information indicating the in-use map every time the in-use map is switched. The in-use map corresponds to in-use data.

The controller 17 uses the first map in the control sequences between a timing t10 and a timing t12. Therefore, the in-use map information, indicating that the first map is in use, is stored. Then, the controller 17 switches from the first map to the second map at a timing t13. Therefore, the information indicating the in-use map is updated to the in-use map information indicating that the second map is in use. A method for storing the in-use map information and a storage destination are not particularly limited. A method for switching the in-use map (selection method) will be described later.

In addition, the controller 17 determines and updates the target carbon dioxide adsorption amount for each cycle (timing t10 to t13) of the control sequences, as shown in FIG. 16. Then, the controller 17 stores an update determination result indicating whether the target carbon dioxide adsorption amount has been updated. The controller 17 stores, as the update determination result, either information indicating that the update has not been performed (updated) or information indicating that the update has been performed (non-updated). That is, the controller 17 updates the update determination result every time the target carbon dioxide adsorption amount is updated. The controller 17 does not update the target carbon dioxide adsorption amount at the timings t10, t11, and t13, and stores the information indicating that the update has not been performed (non-updated). On the other hand, the controller 17 updates the target carbon dioxide adsorption amount at the timing t12, and stores the information indicating that the update has been performed (updated). That is, in FIG. 16, the carbon dioxide monitor value is out of the adsorption amount holding range at the timing t12, so that the target carbon dioxide adsorption amount is updated.

A method for storing the update determination result and a storage destination are not particularly limited. Furthermore, the controller 17 only needs to be able to grasp whether the timing, at which the carbon dioxide recovery amount has been detected, is the first detection timing after the target carbon dioxide adsorption amount is updated. Therefore, the controller 17 may store, when the target carbon dioxide adsorption amount is updated, the information indicating that the update has been performed, and may delete, when the target carbon dioxide adsorption amount is not updated in the next control sequence, the information indicating that the update has been performed. The first detection timing can also be said to be a time when the carbon dioxide recovery amount is first acquired.

As described above, the controller 17 acquires the adsorption time period from the adsorption amount change map data according to the target carbon dioxide adsorption amount. Therefore, the controller 17 may update the adsorption time period. Then, the controller 17 stores an adsorption time period update result indicating whether the adsorption time period has been updated. The controller 17 stores, as the adsorption time period update result, either information indicating that the adsorption time period has not been updated or information indicating that the adsorption time period has been updated. That is, the controller 17 updates the adsorption time period update result every time the adsorption time period is updated. The controller 17 does not update the adsorption time period at the timings t10, t11, and t13, and stores the information indicating that the adsorption time period has not been updated. On the other hand, the controller 17 updates the adsorption time period at the timing t12, and stores the information indicating that the adsorption time period has been updated.

A method for storing the adsorption time period update result and a storage destination are not particularly limited. Furthermore, the controller 17 may store, when the adsorption time period is updated, the information indicating that the adsorption time period has been updated, and may delete, when the adsorption time period is not updated in the next control sequence, the information indicating that the adsorption time period has been updated.

Figure 13:
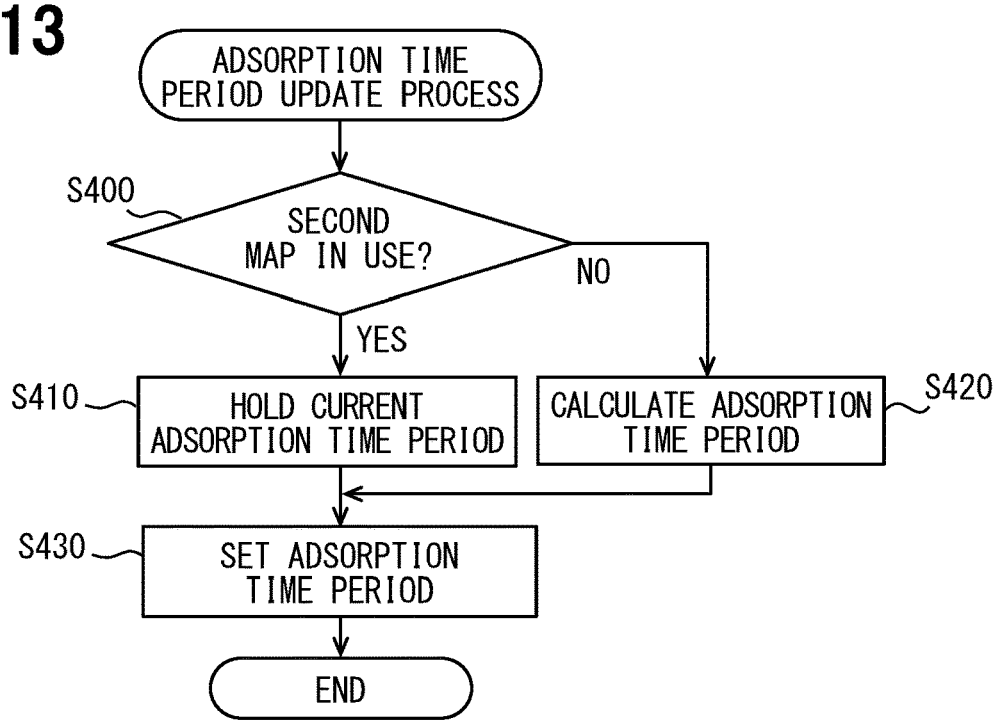
FIG. 13 is a flowchart showing an adsorption time period update process according to a second embodiment.

Here, an adsorption time period update process will be described with reference to FIG. 13. When the target carbon dioxide adsorption amount is updated in the step S320, the controller 17 starts a process shown in the flowchart of FIG. 13.

In a step S400, it is determined whether the second map is currently in use. The controller 17 determines based on the in-use map information whether the second map is currently in use. When the controller 17 determines that the second map is in use, the process proceeds to a step S410. When the controller 17 determines that the second map is not in use, the process proceeds to a step S420.

In the step S410, the current adsorption time period is held. When the second map is used, the controller 17 does not update the adsorption time period even if the target carbon dioxide adsorption amount is updated.

In the step S420, an adsorption time period is calculated. When the first map is used, the controller 17 updates the adsorption time period with the update of the target carbon dioxide adsorption amount. That is, the controller 17 acquires, by using the first map, the adsorption time period associated with the updated target carbon dioxide adsorption amount.

In a step S430, the adsorption time period is set. Therefore, in the adsorption mode, the controller 17 applies the adsorption potential only for the set adsorption time period.

Figure 14:
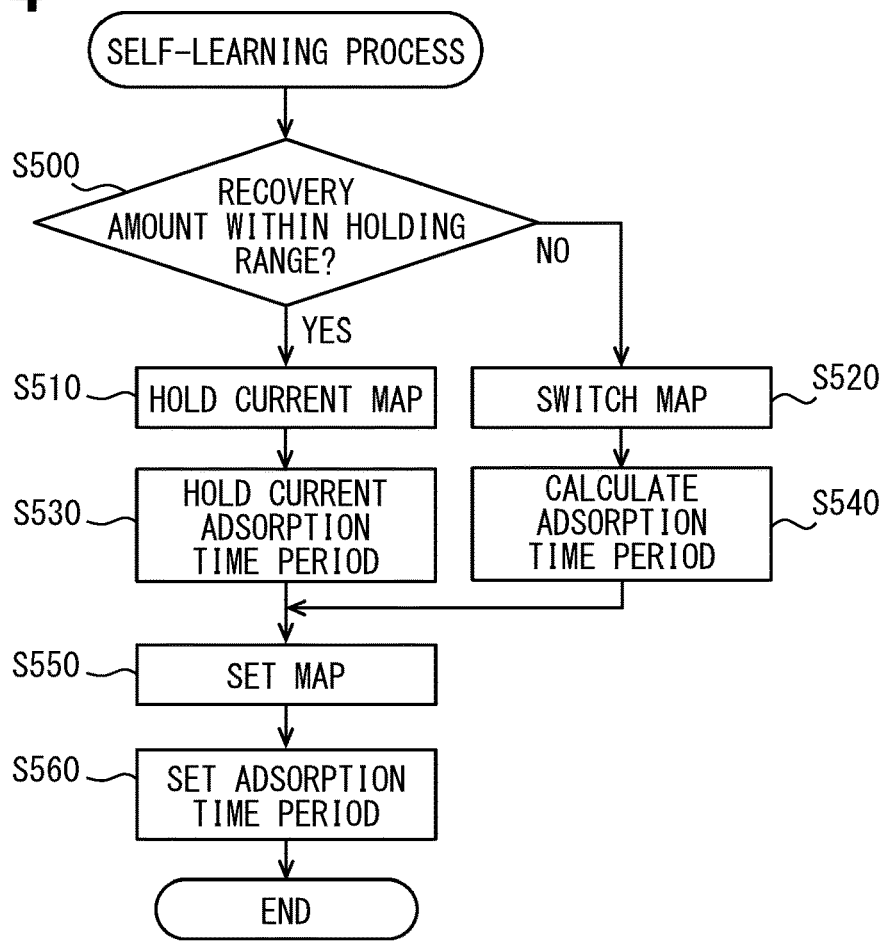
FIG. 14 is a flowchart showing a self-learning process according to the second embodiment.

Next, a self-learning process, which is a method for switching the in-use map, will be described with reference to FIG. 14. The controller 17 starts the process shown in the flowchart of FIG. 14 at the first detection timing after the target carbon dioxide adsorption amount is updated. It can also be said that, only at a timing when the carbon dioxide monitor value is first obtained after the target carbon dioxide adsorption amount is changed, the controller 17 performs selective determination on the in-use map according to the carbon dioxide monitor value. In the present embodiment, the controller 17 starts the process shown in the flowchart of FIG. 14 at the timing t13. Note that, here, an example is adopted in which the current in-use map is the first map.

The carbon dioxide recovery system 10 estimates a target carbon dioxide adsorption amount (maximum adsorption amount) from the carbon dioxide monitor value. The carbon dioxide recovery system 10 does not directly obtain the target carbon dioxide adsorption amount. That is, it can also be said that the adsorption characteristics of the electrochemical cell are uncertain. It is can be considered that the adsorption amount of the electrochemical cell decreases, for example, due to a decrease in the carbon dioxide concentration of supplied atmosphere depending on the humidity of the atmosphere, the supply amount of the atmosphere, or the like, or due to deterioration over time (decrease in adsorption area, etc.) of the electrochemical cell. Therefore, it can be considered that the electrochemical cell adsorbs carbon dioxide with the same slope and is saturated at the adsorption upper limit, or adsorbs carbon dioxide with the slope changed. Therefore, the controller 17 performs a self-learning process in order to select a map corresponding to a decreasing trend of the adsorption amount.

In a step S500, it is determined whether the carbon dioxide recovery amount is within the adsorption amount holding range. That is, the controller 17 determines whether the carbon dioxide monitor value detected through the sensor is within the adsorption amount holding range. When the controller 17 determines that the carbon dioxide monitor value is within the adsorption amount holding range, the process proceeds to a step S510. When the controller 17 determines that the carbon dioxide monitor value is not within the adsorption amount holding range, the process proceeds to a step S520. The carbon dioxide monitor value here is the first carbon dioxide monitor value after the target carbon dioxide adsorption amount is updated.

That is, it can be said that the controller 17 determines whether the decreasing trend of the carbon dioxide monitor value has no slope change or any slope change. Therefore, when determining that the carbon dioxide monitor value is within the adsorption amount holding range, the controller 17 regards the decreasing trend of the carbon dioxide monitor value as having no slope. When determining that the carbon dioxide monitor value is out of the adsorption amount holding range, the controller 17 regards the decreasing trend of the carbon dioxide monitor value as having any slope.

In the step S510, the current in-use map is held. When determining that the carbon dioxide monitor value is within the adsorption amount holding range, the controller 17 regards that it is not necessary to switch the in-use map and holds the current in-use map. Here, the controller 17 holds the first map. In other words, the controller 17 selects the first map without switching the in-use map.

In the step S520, the in-use map is switched. When determining that the carbon dioxide monitor value is out of the adsorption amount holding range, the controller 17 regards that it is necessary to switch the in-use map and switches the current in-use map. Here, the controller 17 switches the in-use map from the first map to the second map. As described above, the controller 17 selects the in-use map to acquire the adsorption time period from the plurality of pieces of adsorption amount change map data according to the carbon dioxide monitor value.

In a step S530, the currently used adsorption time period is held. The controller 17 holds the adsorption time period calculated (acquired) in the step S420. On the other hand, in a step S540, an adsorption time period is newly calculated. That is, the controller 17 acquires, by using the second map, an adsorption time period associated with the updated target carbon dioxide adsorption amount. Therefore, in the step S540, the adsorption time period acquired in the step S420 is updated to the adsorption time period newly acquired by using the second map. In addition, the controller 17 newly acquires, by using the second map, an adsorption time period longer than the adsorption time period acquired in the step S420. Then, the controller 17 sets the in-use map in a step S550, and sets the adsorption time period in a step S560. The present embodiment can be implemented in combination with the first and second modifications.

The carbon dioxide recovery system 10 according to the present embodiment can achieve the same effects as those of the above embodiment. Furthermore, in the carbon dioxide recovery system 10, a first map and a second map, having different adsorption time periods associated with the target adsorption amount, are stored in the storage unit 18. It can also be said that the first map and the second map have different adsorption time periods associated with the decreased target carbon dioxide adsorption amount. It can also be considered that the adsorption amount of the electrochemical cell temporarily increases with a change over time, cleaning of the electrochemical cell, or the like. Therefore, the first map and the second map can be adopted even if the adsorption time periods associated with the increased target carbon dioxide adsorption amount are different in part. That is, it can be said that the first map and the second map have different adsorption time periods associated with the changed target carbon dioxide adsorption amount.

Then, the carbon dioxide recovery system 10 selects a in-use map to acquire the adsorption time period from the first map and the second map according to the carbon dioxide monitor value. Therefore, the carbon dioxide recovery system 10 can appropriately control the adsorption time period that is the application time period of the adsorption potential. That is, it can be said that the carbon dioxide recovery system 10 can appropriately control the adsorption time period while estimating the target carbon dioxide adsorption amount and the adsorption time period from the carbon dioxide monitor value. In addition, it can be said that, even if the electrochemical cell adsorbs carbon dioxide with the same slope and is saturated at the adsorption upper limit or adsorbs carbon dioxide with the slope changed, the carbon dioxide recovery system 10 can appropriately control the adsorption time period by selecting the in-use map as described above.

Furthermore, the carbon dioxide recovery system 10 can appropriately control the adsorption time period, so that it is possible to suppress the adsorption time period from becoming longer than necessary. That is, the carbon dioxide recovery system 10 can reduce waste time. Accordingly, the carbon dioxide recovery system 10 can improve the number of cycles of the control sequences. Therefore, the carbon dioxide recovery system 10 can improve the recovery amount of carbon dioxide.

By selecting the first map as described above, the carbon dioxide recovery system 10 can suppress the adsorption time period from becoming longer than necessary, and thus can reduce an energy loss caused by the application of the adsorption potential when the adsorption amount of the electrochemical cell changes. In addition, by selecting the second map as described above, the carbon dioxide recovery system 10 can reduce a recovery loss of carbon dioxide when the adsorption amount of the electrical chemical cell changes.

Although the present disclosure has been described in accordance with the embodiments, it is understood that the present disclosure is not limited to the embodiments and structures. The present disclosure also includes various modifications and variations within the scope of equivalents. In addition, although various combinations and modes are shown in the present disclosure, other combinations and modes including only one element, more elements, or less elements are also included in the scope and idea of the present disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A carbon dioxide recovery system that recovers carbon dioxide from a mixed gas containing carbon dioxide by an electrochemical reaction, the system comprising:
   a carbon dioxide recovery tank configured to store recovered carbon dioxide;
   a recovery device including a housing and an electrochemical cell housed in the housing, the electrochemical cell including a working electrode having an adsorbent capable of adsorbing carbon dioxide, and a counter electrode paired with the working electrode;

a sensor configured to detect a recovery amount that is an amount of carbon dioxide recovered in the recovery device and sent to the carbon dioxide recovery tank;

a controller configured to execute an adsorption mode in which carbon dioxide is adsorbed and a recovery mode in which carbon dioxide is recovered, wherein the controller is configured to apply a first potential between the working electrode and the counter electrode only for an adsorption time period in the adsorption mode such that the adsorbent adsorbs carbon dioxide, the adsorption time period corresponding to a target adsorption amount that is an amount of carbon dioxide that can be adsorbed by the adsorbent, and apply a second potential between the working electrode and the counter electrode only for a recovery time period in the recovery mode such that the carbon dioxide adsorbed by the adsorbent is desorbed; and a storage unit that stores multiple adsorption-amount change data, each of which indicates association between the target adsorption amount and the adsorption time period, wherein the multiple adsorption-amount change data are different in the adsorption time period associated with the target adsorption amount that has been changed, and the controller is configured to acquire the target adsorption amount as a correlation value correlated with the recovery amount that is a detection result of the sensor, acquire the adsorption time period from one of the multiple adsorption-amount change data by using the acquired target adsorption amount, and select data from among the multiple adsorption-amount change data according to the recovery amount as in-use data for acquisition of the adsorption time period.

2. The carbon dioxide recovery system according to claim 1, wherein the multiple adsorption amount change data stored by the storage unit includes first adsorption amount change data and second adsorption amount change data, the adsorption time period decreases with decrease in the target adsorption amount in the first adsorption amount change data, and the adsorption time period is constant regardless of decrease in the target adsorption amount in the second adsorption amount change data.

3. The carbon dioxide recovery system according to claim 1, wherein the controller is configured to change the target adsorption amount according to a change in the recovery amount that is the detection result, and select the in-use data according to the recovery amount only at a timing when the detection result is first obtained after the target adsorption amount is changed.

4. The carbon dioxide recovery system according to claim 3, wherein the controller is configured to change the target adsorption amount when the recovery amount is out of an adsorption amount holding range, hold the current in-use data when the recovery amount that is the detection result first obtained after an change of the target adsorption amount is within the adsorption amount holding range, and switch the in-use data when the recovery amount that is the detection result first obtained after the target adsorption amount is changed is out of the adsorption amount holding range.

5. The carbon dioxide recovery system according to claim 2, wherein the controller is configured to hold the current adsorption time period when the in-use data is the second adsorption amount change data, and acquire the adsorption time period associated with the target adsorption amount in the first adsorption amount change data when the in-use data is the first adsorption amount change data.

* * * * *